US012737242B2

(12) United States Patent
Takamizawa et al.

(10) Patent No.: US 12,737,242 B2
(45) Date of Patent: Sep. 15, 2026

(54) INFORMATION PROCESSING SYSTEM, INFORMATION PROCESSING METHOD, AND INFORMATION PROCESSING TERMINAL

(71) Applicant: Maxell, Ltd., Kyoto (JP)

(72) Inventors: Naohisa Takamizawa, Otokuni-gun (JP); Yasunobu Hashimoto, Otokuni-gun (JP); Kazuhiko Yoshizawa, Otokuni-gun (JP); Yoshinori Okada, Otokuni-gun (JP)

(73) Assignee: MAXELL, LTD., Kyoto (JP)

( * ) Notice: Subject to any disclaimer, the term of this patent is extended or adjusted under 35 U.S.C. 154(b) by 741 days.

(21) Appl. No.: 17/928,937

(22) PCT Filed: Jun. 2, 2020

(86) PCT No.: PCT/JP2020/021710

§ 371 (c)(1),
(2) Date: Dec. 1, 2022

(87) PCT Pub. No.: WO2021/245773

PCT Pub. Date: Dec. 9, 2021

(65) Prior Publication Data

US 2023/0297447 A1 Sep. 21, 2023

(51) Int. Cl.
*G06F 9/54* (2006.01)
*G06F 3/04817* (2022.01)

(52) U.S. Cl.
CPC .......... *G06F 9/543* (2013.01); *G06F 3/04817* (2013.01)

(58) Field of Classification Search
CPC ...... G06F 9/543; G06F 3/04817; G06F 3/013; G06F 3/016; G06F 3/0482;
(Continued)

(56) References Cited

U.S. PATENT DOCUMENTS 11,070,647 B1 * 7/2021 Korobov ............. H04L 63/0815
2013/0013692 A1 * 1/2013 Sasakura ............. H04L 65/1094 709/204
(Continued)

FOREIGN PATENT DOCUMENTS

JP 2013-152642 A 8/2013
JP 2015-126467 A 7/2015
(Continued)

OTHER PUBLICATIONS

International Search Report and Written Opinion mailed on Aug. 25, 2020, received for PCT Application PCT/JP2020/021710, filed on Jun. 2, 2020, 9 pages including English Translation.

*Primary Examiner* — Kevin L Young
*Assistant Examiner* — Jennifer Marie Gutman
(74) *Attorney, Agent, or Firm* — XSENSUS LLP

(57) ABSTRACT

An information processing system in which a plurality of terminals cooperate to execute an application commonly provided in each terminals, comprises a first-information-terminal and a second-information-terminal as the plurality of terminals, the second-information-terminal includes: an acceptance section that accepts an instruction to start the application; and a linkage controller that causes the second-information-terminal to operate in either an independent-operation-mode or a linkage-operation-mode, the first-information-terminal includes an output section that outputs an execution result of the application executed in the linkage-operation-mode, the independent-operation-mode is an operation mode for causing the second-information-terminal to execute the application independently, and the linkage-operation-mode is an operation mode in which the application is executed on the first-information-terminal and the second-information terminal being linked with each other, and a linked state in which the second-information-terminal
(Continued)

is operable in the linkage-operation-mode is defined based on placement of the first-information-terminal and the second-information-terminal.

20 Claims, 21 Drawing Sheets

(58) Field of Classification Search
CPC ................ G06F 3/04842; G06F 13/00; H04M 1/72412; H04M 1/72442
See application file for complete search history.

(56) References Cited

U.S. PATENT DOCUMENTS

| | | | | |
|---|---|---|---|---|
| 2013/0347024 | A1* | 12/2013 | Sugiue ............... | H04N 21/4222 725/25 |
| 2015/0015459 | A1* | 1/2015 | Cho ...................... | H04M 1/724 345/8 |
| 2015/0049112 | A1* | 2/2015 | Liu ...................... | G02B 27/017 345/633 |
| 2015/0253930 | A1* | 9/2015 | Kozloski ............ | H04N 21/4312 345/175 |
| 2016/0088480 | A1* | 3/2016 | Chen ................... | H04L 67/1095 709/229 |
| 2016/0162020 | A1* | 6/2016 | Lehman .................. | G06F 3/017 715/835 |
| 2016/0360259 | A1* | 12/2016 | Hashimoto ............ | H04H 20/93 |
| 2017/0077974 | A1* | 3/2017 | Aoki ..................... | H04W 12/06 |
| 2017/0192730 | A1* | 7/2017 | Yang ..................... | H04L 67/025 |
| 2017/0230463 | A1 | 8/2017 | Takahashi et al. | |
| 2019/0075610 | A1* | 3/2019 | Ko ........................ | H04W 12/50 |
| 2019/0304406 | A1* | 10/2019 | Griswold ................. | G09G 5/14 |
| 2020/0192564 | A1* | 6/2020 | Zhu ..................... | G06F 3/04883 |
| 2020/0254339 | A1* | 8/2020 | Lee ......................... | A63F 13/30 |
| 2021/0255461 | A1 | 8/2021 | Watanabe et al. | |

FOREIGN PATENT DOCUMENTS

| | | | |
|---|---|---|---|
| JP | 2017-142693 | A | 8/2017 |
| WO | 2012/063395 | A1 | 5/2012 |
| WO | 2020/003361 | A1 | 1/2020 |

* cited by examiner

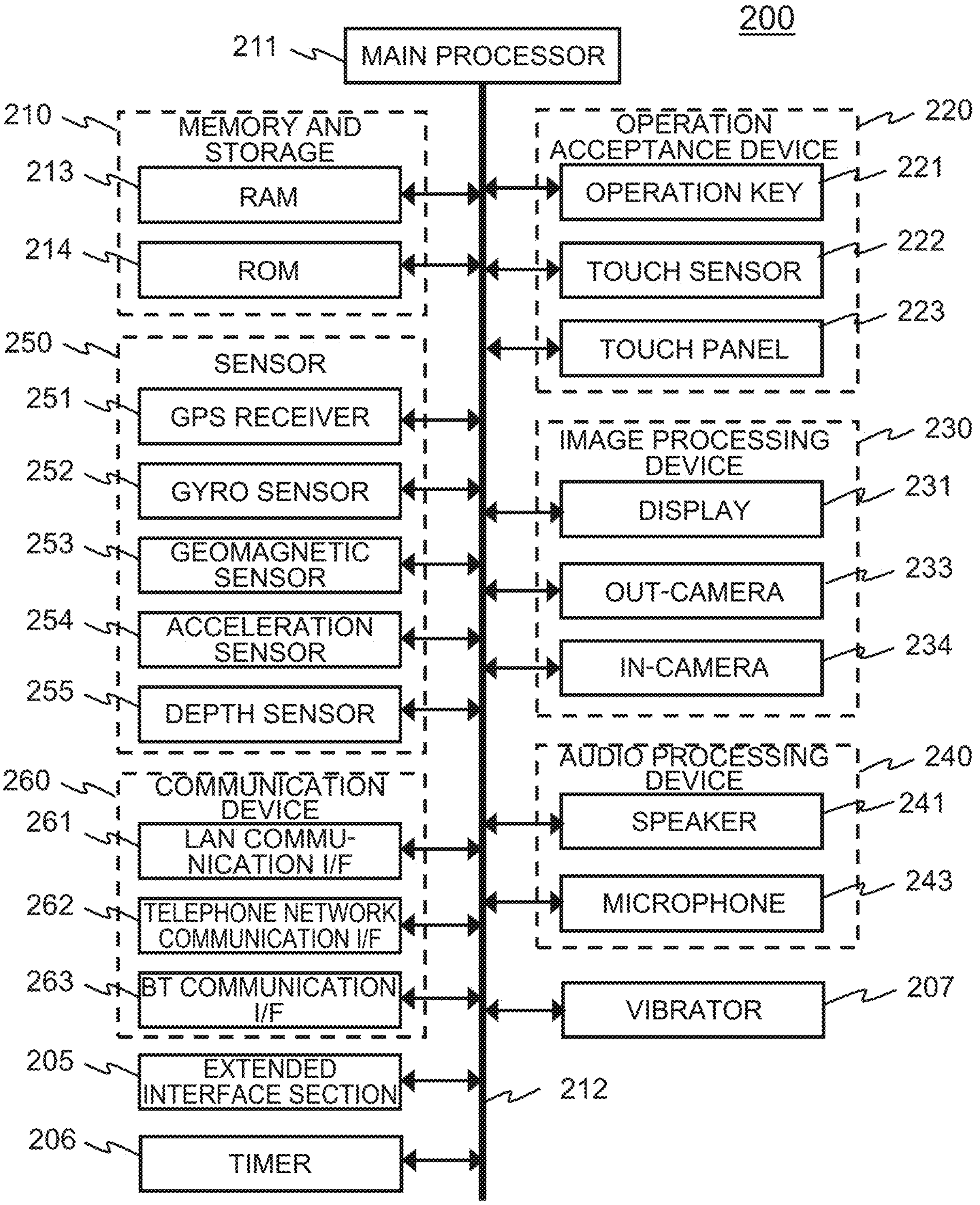

FIG. 5
200
211
MAIN PROCESSOR
210
MEMORY AND STORAGE
213
RAM
214
ROM
220
OPERATION ACCEPTANCE DEVICE
221
OPERATION KEY
222
TOUCH SENSOR
223
TOUCH PANEL
250
SENSOR
251
GPS RECEIVER
252
GYRO SENSOR
253
GEOMAGNETIC SENSOR
254
ACCELERATION SENSOR
255
DEPTH SENSOR
230
IMAGE PROCESSING DEVICE
231
DISPLAY
233
OUT-CAMERA
234
IN-CAMERA
260
COMMUNICATION DEVICE
261
LAN COMMU-NICATION I/F
262
TELEPHONE NETWORK COMMUNICATION I/F
263
BT COMMUNICATION I/F
240
AUDIO PROCESSING DEVICE
241
SPEAKER
243
MICROPHONE
207
VIBRATOR
205
EXTENDED INTERFACE SECTION
212
206
TIMER

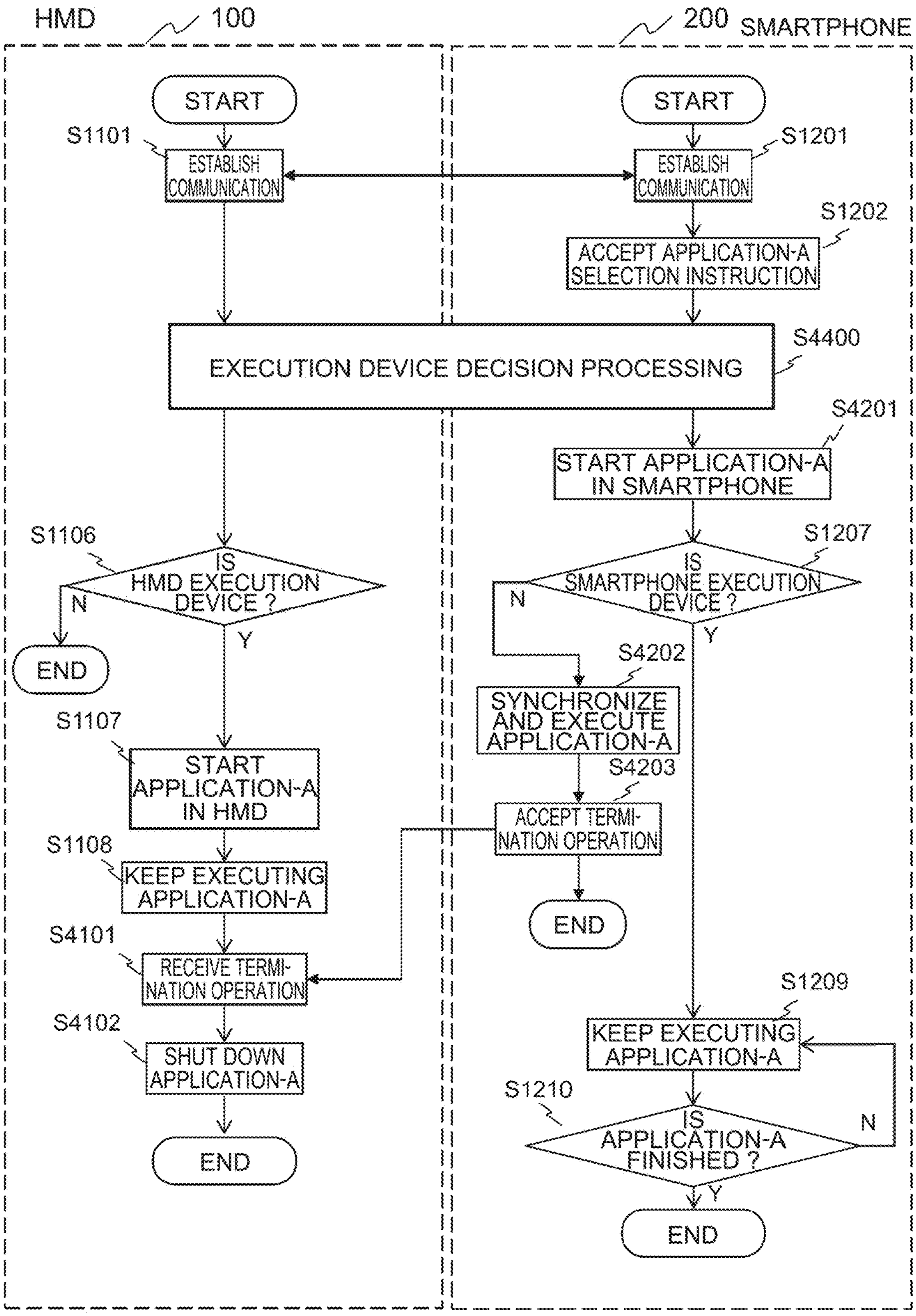

FIG. 12
HMD
100
200
SMARTPHONE
START
S1101
ESTABLISH COMMUNICATION
START
S1201
ESTABLISH COMMUNICATION
S1202
ACCEPT APPLICATION-A SELECTION INSTRUCTION
S4400
EXECUTION DEVICE DECISION PROCESSING
S4201
START APPLICATION-A IN SMARTPHONE
S1106
IS HMD EXECUTION DEVICE ?
N
Y
END
S1207
IS SMARTPHONE EXECUTION DEVICE ?
N
Y
S4202
SYNCHRONIZE AND EXECUTE APPLICATION-A
S1107
START APPLICATION-A IN HMD
S4203
ACCEPT TERMINATION OPERATION
S1108
KEEP EXECUTING APPLICATION-A
END
S4101
RECEIVE TERMINATION OPERATION
S4102
SHUT DOWN APPLICATION-A
END
S1209
KEEP EXECUTING APPLICATION-A
S1210
IS APPLICATION-A FINISHED ?
N
Y
END

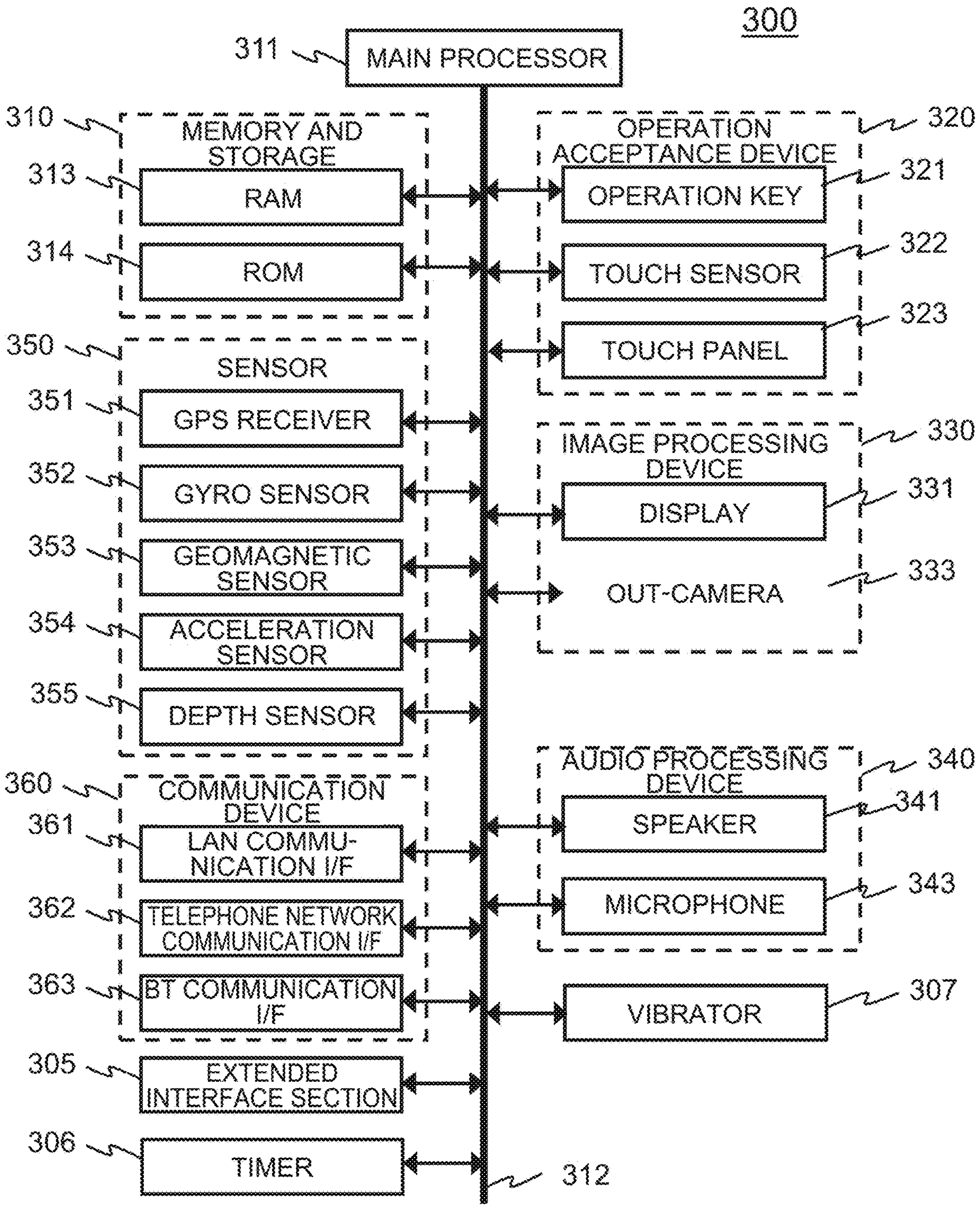

311 MAIN PROCESSOR

310 MEMORY AND STORAGE
313 RAM
314 ROM

350 SENSOR
351 GPS RECEIVER
352 GYRO SENSOR
353 GEOMAGNETIC SENSOR
354 ACCELERATION SENSOR
355 DEPTH SENSOR

360 COMMUNICATION DEVICE
361 LAN COMMU-NICATION I/F
362 TELEPHONE NETWORK COMMUNICATION I/F
363 BT COMMUNICATION I/F

305 EXTENDED INTERFACE SECTION
306 TIMER

320 OPERATION ACCEPTANCE DEVICE
321 OPERATION KEY
322 TOUCH SENSOR
323 TOUCH PANEL

330 IMAGE PROCESSING DEVICE
331 DISPLAY
333 OUT-CAMERA

340 AUDIO PROCESSING DEVICE
341 SPEAKER
343 MICROPHONE

307 VIBRATOR

312

INFORMATION PROCESSING SYSTEM, INFORMATION PROCESSING METHOD, AND INFORMATION PROCESSING TERMINAL

CROSS-REFERENCE TO RELATED APPLICATION

The present application is based on PCT filing PCT/JP2020/021710, filed Jun. 2, 2020, the entire contents of which are incorporated herein by reference.

TECHNICAL FIELD

The present invention relates to a technique for controlling start of application software (hereinafter, referred to as an application) among a plurality of information terminals.

BACKGROUND ART

Due to its narrow display area, there may be the case that a head-mounted display (HMD) is linked with other information terminals for use. For example, Patent Literature 1 discloses an application linkage device which "includes a first management unit that manages device information including information used to be connected with a linkage-destination device and information on data to be used by an application registered in the linkage-destination device, a second management unit that refers to the device information and acquires linkage candidates indicating linkable linkage-destination devices and applications with respect to a linkage request from a linkage-source device, and a linkage controller that starts an application indicated as one of the linkage candidates and sets, as a linkage destination, a device subject to linkage and a linkable application registered in the relevant device.

CITATION LIST

Patent Literature

Patent Literature 1: JP-A-2017-142693

SUMMARY OF INVENTION

Technical Problem

According to the technique of Patent Literature 1, using other information terminals to select and identify a desired application enables improvement in the operability of an HMD. However, according to the technique of Patent Literature 1, the applications are started on all the information terminals in which the applications are registered, respectively. Execution of an application on an information terminal that is not intended to start the application may disadvantageously hinder its operation, for example, may cause stop of other applications on the information terminal.

The present invention has been made in view of the circumstances described above, and an object of the present invention is to provide an information processing technique that excels in usability and enables an application to be easily started and executed on a desired device among a plurality of information terminals equipped with the same or corresponding applications, without increasing a burden on a user.

Solution to Problem

The present invention provides an information processing system for linking a plurality of terminals to execute an application commonly provided in each of the plurality of terminals, comprising a first information terminal and a second information terminal as the plurality of terminals, the second information terminal including: an acceptance section that accepts an instruction to start the application; and a linkage controller that causes the second information terminal to operate in either an independent operation mode or a linkage operation mode, the first information terminal including an output section that outputs an execution result of the application executed in the linkage operation mode, the independent operation mode being an operation mode for causing the second information terminal to execute the application independently, and the linkage operation mode being an operation mode for causing the first information terminal and the second information terminal to execute the application with the first information terminal and the second information terminal being linked with each other, and a linked state in which the second information terminal is operable in the linkage operation mode being defined based on placement of the first information terminal and the second information terminal.

Advantageous Effects of Invention

According to the present invention, it is possible to provide an information processing technique that excels in usability and enables an application to be easily started and executed on a desired device among a plurality of information terminals equipped with the same or corresponding applications, without increasing a burden on a user. The problems, configurations, and advantageous effects other than those described above will be clarified by explanation of the embodiments below.

BRIEF DESCRIPTION OF DRAWINGS

FIG. 5 is a hardware configuration diagram of a smartphone according to the first embodiment.

FIG. 12 illustrates an exemplary flowchart of the application linkage processing according to the fourth embodiment.

FIG. 17 is a hardware configuration diagram of a smartwatch according to the seventh embodiment.

DESCRIPTION OF EMBODIMENTS

First Embodiment

A first embodiment of the present invention will be described with reference to the drawings. In the present embodiment, common applications that are installed both in a first information processing terminal (first information terminal) and a second information processing terminal (second information terminal) are linked to each other and then executed.

Hereinafter, the present embodiment will be described with reference to an example of using a head-mounted display (hereinafter, referred to as an HMD) as the first information terminal and a smartphone (hereinafter, referred to as a smartphone) as the second information terminal.

Figure 1:
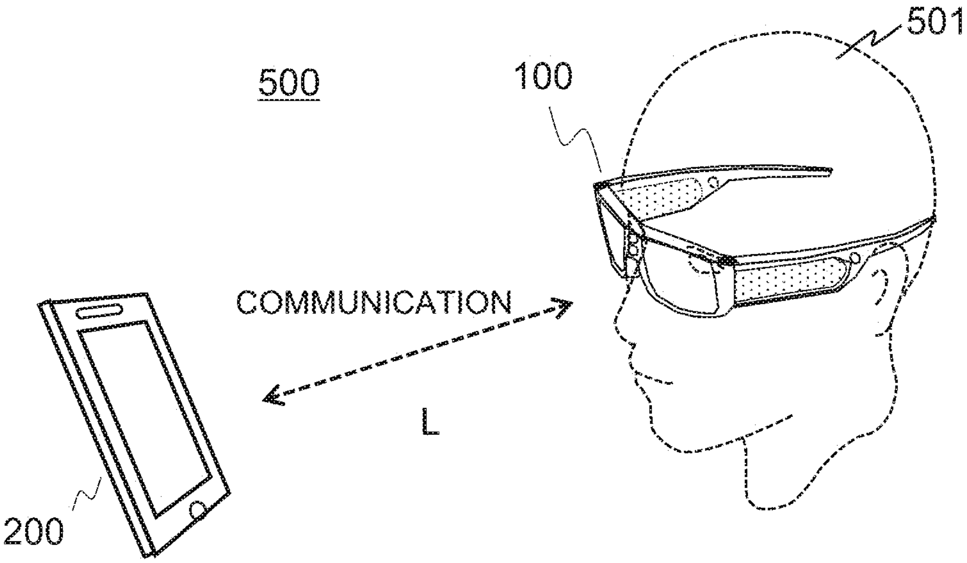
FIG. 1 is a diagram for explaining an outline of an information processing system according to a first embodiment.

FIG. 1 is a diagram schematically illustrating an entire information processing system 500 according to the present embodiment. As illustrated in FIG. 1, the information processing system 500 of the present embodiment includes an HMD 100 that is the first information terminal worn on the head of a user 501 and a smartphone 200 that is the second information terminal held by the user 501 in his or her hand.

The HMD 100 is an information terminal that embodies virtual reality (VR) technology and augmented reality (AR) technology. The virtual reality technology creates a realistically simulated virtual world and allows a user to experience to feel as if he or she is in the virtual world while the augmented reality technology reflects and augments a virtual space (virtual object) which is created with digital information by use of computer graphics (CG) and the like, in a real world. The user 501 wears the HMD 100 on his or her head. A display area of the HMD 100 is narrow due to structural constraints, and thus detailed operations are hardly to be performed thereon.

The smartphone 200 includes the functions of calling and communication independently. The smartphone 200 displays an icon on a display in a manner allowing a user to easily recognize it, and has suitable operability by touching. Note that an icon is a graphic symbol that is capable of starting an application in response to an approach or a touch operation using a finger of the user 501, a touch pen, or the like.

In the present embodiment, linking the HMD 100 and the smartphone 200 with each other enables the smartphone 200 to instruct start of an application software (hereinafter, referred to as an application) installed in the HMD 100, whereby the application is executed in the HMD 100. In the present embodiment, the state described above is referred to as a linked state. Note that, in the following, the HMD 100 and the smartphone 200 will be referred to as informational terminals unless they need to be distinct from each other.

In the first embodiment, the HMD 100 determines whether the HMD 100 and the smartphone 200 are linked with each other. Whether the HMD 100 and the smartphone 200 are in the linked state is determined based on a placement state of them. Specifically, as illustrated in FIG. 2(*a*), they are determined to be in the linked state when an icon 420 (421, 422, 423) of applications displayed on a display 231 of the smartphone 200 are included within a predetermined linkage visual field 101*a* of a display 131 (131*a*, 131*b*) of the HMD 100.

Figure 2A:
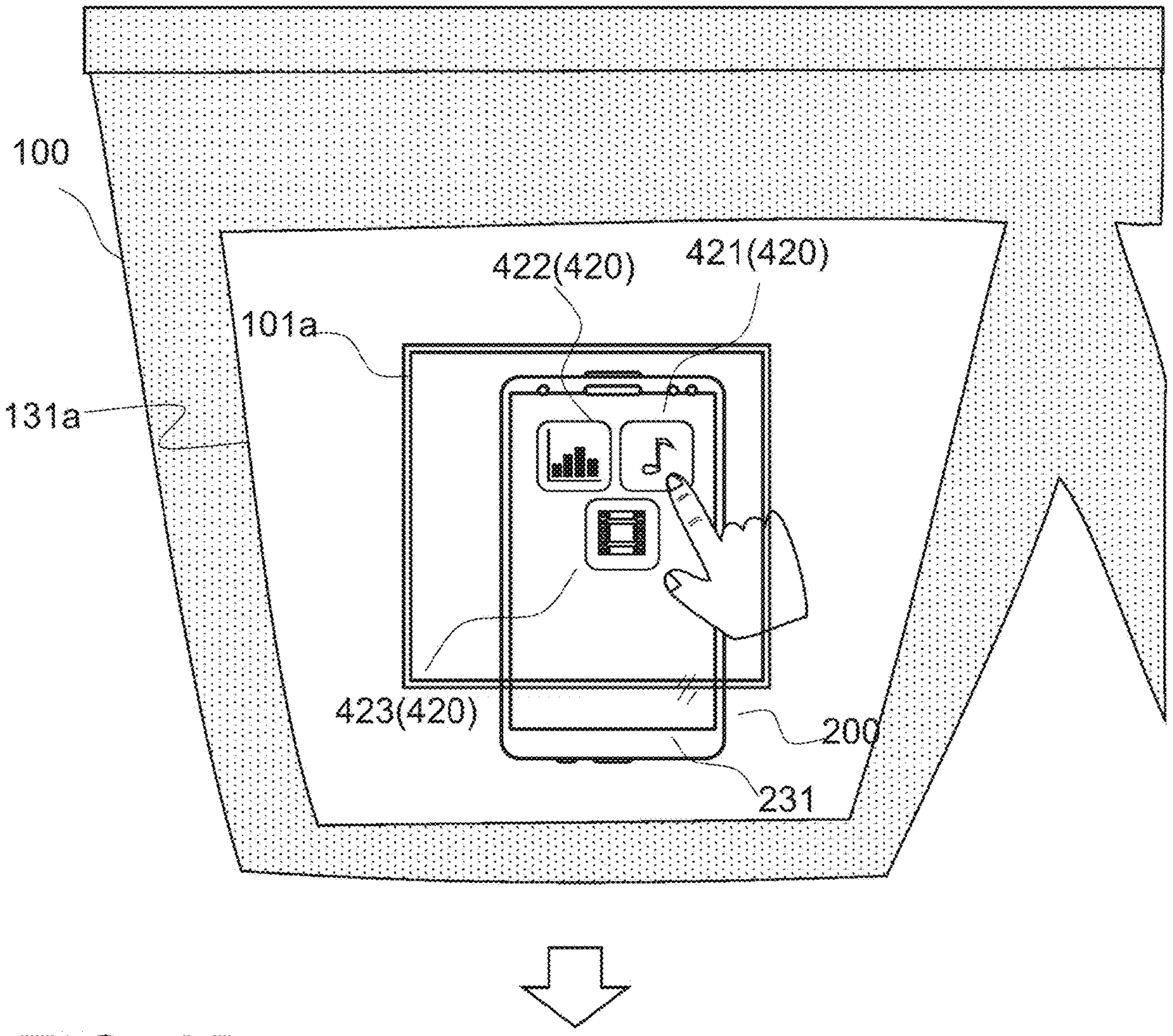
FIG. 2(*a*) and FIG. 2(*b*) are diagrams for explaining a linked state according to the first embodiment.
Figure 2B:
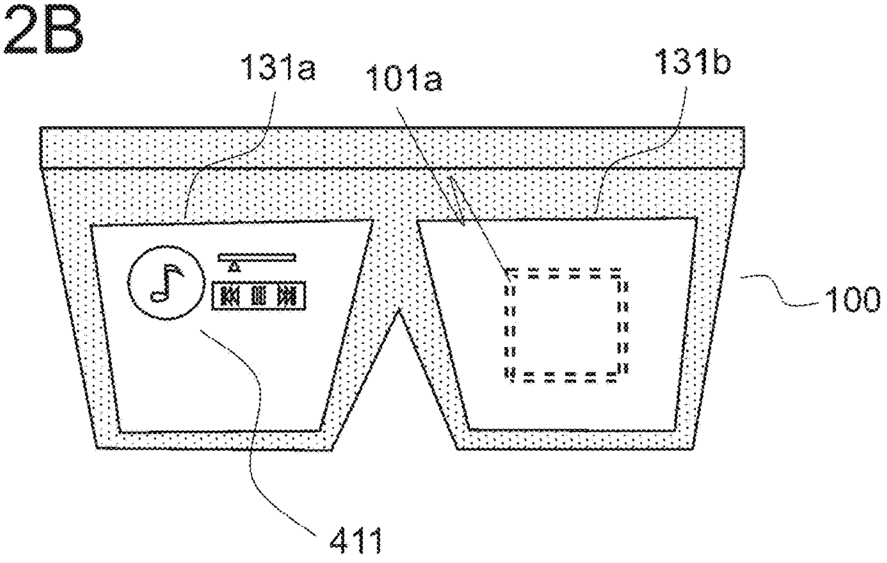

FIG. 2(*a*) illustrates a scene in which an icon 421 of an application software A (application A) included in the linkage visual field 101*a* is selected. In the following, a placement state of the HMD 100 and the smartphone 200 such as the one in which the icon 420, which corresponds to an application desired to be started, is included within the linkage visual field 101*a* is referred to as a predetermined placement state.

When the HMD 100 and the smartphone 200 are in the predetermined placement state, it is determined that they are in the linked state. The user 501 touches the icon 421 displayed on the smartphone 200 through the display 131 of the HMD 100 to select it (FIG. 2(*a*)), whereby, for example, the smartphone 200 issues an instruction to start the application corresponding to the selected icon 421 and the HMD 100 executes the application (FIG. 2(*b*)). FIG. 2(*b*) illustrates a scene in which the HMD 100 executes the selected application and displays an icon 411 thereof.

In the present embodiment, in the linked state, for example, when the user 501 touches the icon 421 of the application A and the smartphone 200 accepts the selection made by the user 501, the smartphone 200 and the HMD 100 communicate with each other so that the touch information by the user 501 can be transmitted from the smartphone 200 to the HMD 100.

Upon receiving the touch information on the icon 421, the HMD 100 accepts the received information as an instruction to start the application and thus starts the application A in the HMD 100.

Figure 3A:
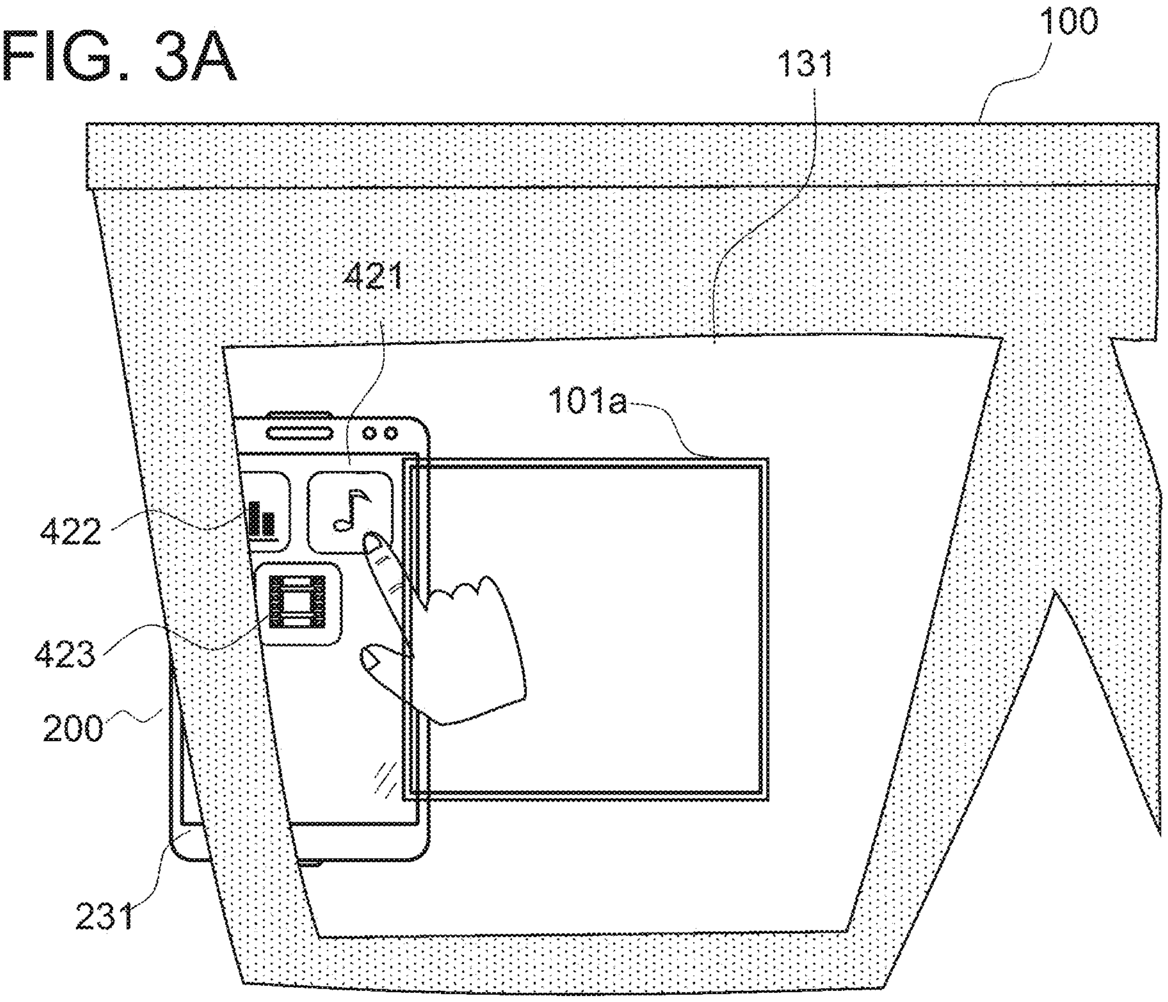
FIG. 3(*a*) and FIG. 3(*b*) are diagrams for explaining a non-linked state according to the first embodiment.
Figure 3B:
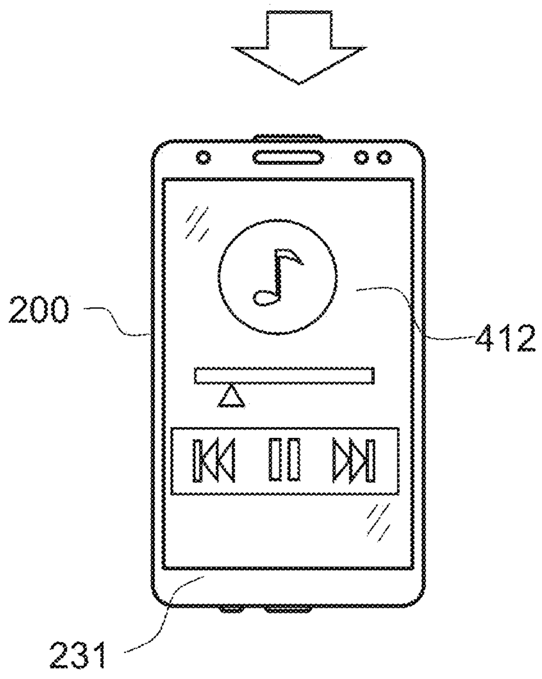

As illustrated in FIG. 3(*a*), a placement state in which the icon 420 displayed on the display 231 of the smartphone 200 is not included in the linkage visual field 101*a* of the HMD 100 is referred to as a non-predetermined placement state.

In the non-predetermined placement state, when the user 501 touches the icon 421 of the application A, the smartphone 200 accepts the selection of the application A and thus starts the application A as it is based on the accepted selection.

Thus, in the present embodiment, when the user 501 wearing the HMD 100 wants to execute an application on the smartphone 200, he or she may move the smartphone 200 such that the icon 421 is positioned outside a range of the linkage visual field 101*a*.

In the present embodiment, each of the HMD 100 and the smartphone 200 includes the same or corresponding applications used for performing particular actions such as playing music and images, creating documents, and the like. Furthermore, the HMD 100 and the smartphone 200 communicate with each other to transmit and receive data therebetween by wireless communication or wired communication.

[Hardware Configuration]

Hereinafter, hardware configurations of the HMD 100 and smartphone 200, which configure the information processing system 500 of the present embodiment for realizing the processing described above, will be explained, respectively.

Figure 4:
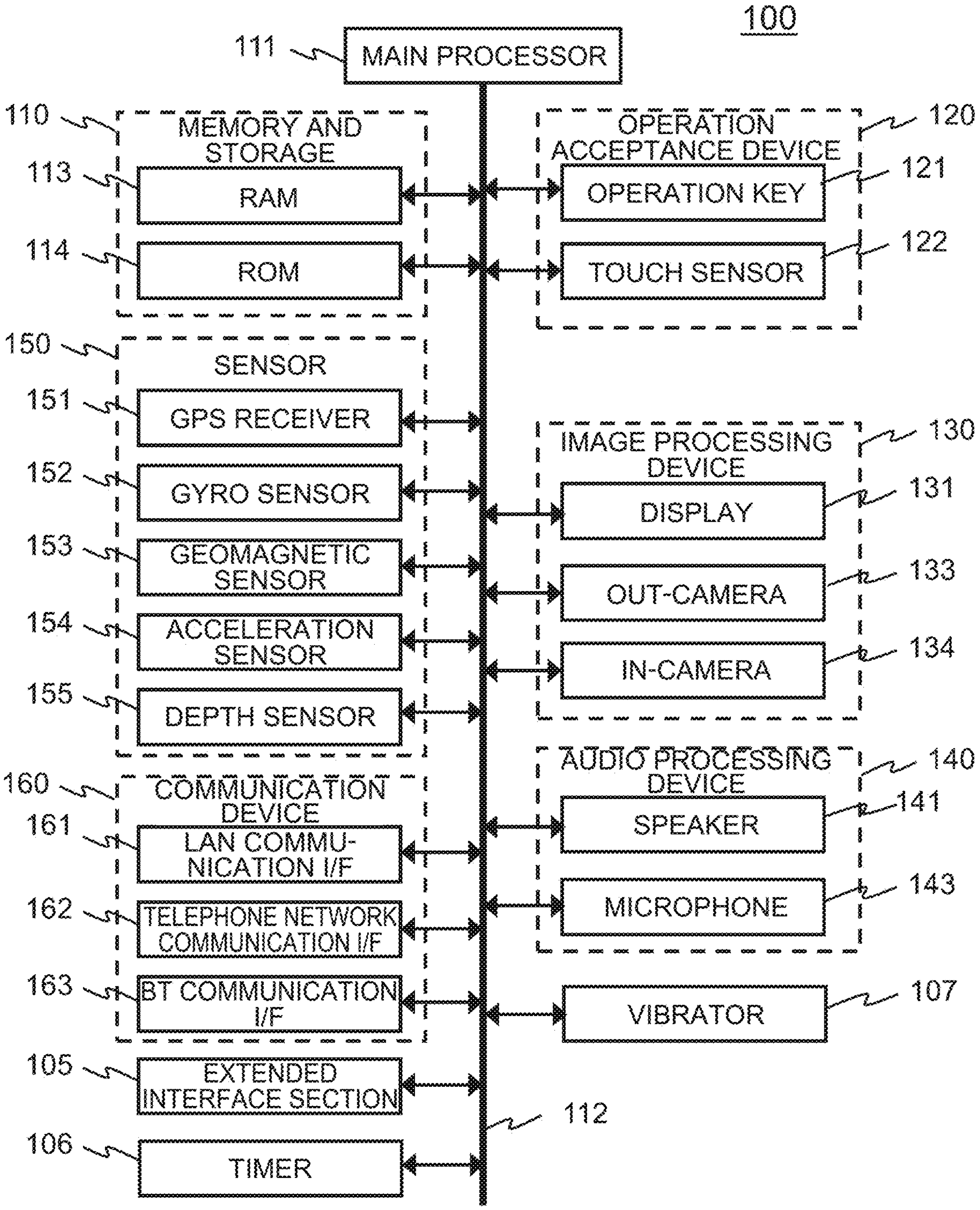
FIG. 4 is a hardware configuration diagram of a head-mounted display according to the first embodiment.

FIG. 4 and FIG. 5 are block diagrams illustrating exemplary configurations of the HMD 100 and smartphone 200, respectively. In FIG. 4 and FIG. 5, the same components as those illustrated in FIG. 1 to FIG. 3 are provided with the same reference signs.

FIG. 4 is a hardware configuration diagram of the HMD 100 according to the present embodiment. As illustrated in FIG. 4, the HMD 100 of the present embodiment includes a main processor 111, a system bus 112, a memory and storage 110, an operation acceptance device 120, an image processing device 130, an audio processing device 140, a sensor 150, a communication device 160, an extended interface (I/F) 105, a timer 106, and a vibrator 107.

The main processor 111 is a main controller that controls the overall operations of the HMD 100 in accordance with a predetermined program. The main processor 111 is implemented by a CPU (Central Processor Unit) or a microprocessor unit (MPU). The main processor 111 executes programs such as an operating system (OS) and various operation control applications stored in the memory and storage 110 so as to perform processing for controlling the overall operations of the HMD 100. Furthermore, the main processor 111 controls operations of starting various applications. The main processor 111 performs the processing in accordance with a clock signal measured and output by the timer 106.

The system bus 112 is a data communication path for transmitting and receiving data between the main processor 111 and each section provided in the HMD 100.

The memory and storage 110 includes a RAM 103 and a ROM 104. The memory and storage 110 retains programs such as an operating system and various operation control applications for music, images, documents, and the like. In addition, information data such as base data necessary for basic operations performed by the operating system and file data started by various applications are stored in the memory and storage 110. For example, when the user 501 starts a music application installed in the HMD 100 and selects music file data, the HMD 100 plays the file data of the selected music, thereby allowing the user 501 to listen to the desired music.

The RAM 103 is a program area during execution of a basic operation program or other application programs. The RAM 103 is a temporary storage area for temporarily retaining data as necessary. The RAM 103 may be integrated with the main processor 111.

The ROM 104 stores, for example, operation settings and user data of the HMD 100. The ROM 104 may store still image data, moving image data, and the like captured by the HMD 100. Here, it is assumed that the HMD 100 can expand its functions by downloading a new application program from an application server via the Internet, and at this time, the downloaded new application program is stored in the ROM 104. The main processor 111 expands and executes, on the RAM 103, the new application program stored in the ROM 104, whereby the HMD 100 can realize various functions.

The ROM 104 is not limited to a mask ROM which is a read-only memory into which data cannot be written, as long as it can retain the stored information even while the HMD 100 is not supplied with power. As the ROM 104, a device such as a flash ROM, an SSD (Solid State Drive), and HDD (Hard Disc Drive) is used.

The operation acceptance device 120 accepts an input of an operation instruction to the HMD 100. In the present embodiment, the operation acceptance device 120 includes operation keys 121 and a touch sensor 122. The operation keys 121 are, for example, a power key, a volume key, and a home key. The touch sensor 122 receives an operation instruction via a touch pad. Note that the HMD 100 of the present embodiment does not necessarily have to include all the elements of the operation acceptance device 120. The HMD 100 may accept an operation instruction to the HMD 100 via a separate information processing terminal device connected thereto by wired communication or wireless communication.

The operation acceptance device 120 may be provided at a position or in a form allowing the user 501 to easily perform an input operation on the HMD 100. The operation acceptance device 120 may be separated from the main body of the HMD 100 and connected thereto by wired or wireless communication. Alternatively, the operation acceptance device 120 may be configured to function using the line of sight of the user 501. In this case, for example, displaying an input operation screen on the display 131 and capturing a position on the input operation screen to which the line of sight of the user 501 detected by an in-camera 134 is directed enables acquisition of the input operation information. Alternatively, displaying a pointer on the input operation screen and operating it also enables the acquisition of the input operation information. The input operation information may be captured by collecting voices uttered by the user 501 which express an input operation with a microphone 143 which will be described later.

The image processing device 130 is an image (video) processor, and includes the display 131, an out-camera 133, and the in-camera 134.

The display 131 is, for example, a display device (display) such as a liquid crystal panel, and provides a user of the HMD 100 with image data processed by an image signal processor. The display 131 includes a left-eye display 131*a* and a right-eye display 131*b*. The display 131 may be an optical see-through display or a video see-through display.

The optical see-through display includes a projection unit that projects various kinds of information such as playing information by applications which have been active and notification information to the user 501, and a transparent half mirror that forms and displays projected various kinds of information in front of the eyes. The video see-through display includes a liquid crystal panel or the like that displays an image of a real space object in front of the eye captured by the out-camera 133 together with various kinds of information. The display 131 allows the user 501 to view not only images within the field of view in front of the eye, but also information about music, images, documents, and the like which are played by the active applications.

In the present embodiment, the display 131 displays an execution status of an application, and the like.

The image signal processor processes images input from the out-camera 133 and the in-camera 134. Furthermore, the image signal processor superimposes an object created by the main processor 111 on the input image and outputs it to the display 131. The image signal processor may be implemented by the main processor 111 or a processor dedicated to images and provided separately from the main processor 111.

The out-camera 133 acquires images of the surroundings of the HMD 100. The out-camera 133 is installed on the front of the HMD 100 to capture images of a field-of-view condition in the front. The HMD 100 may be an optical see-through type HMD allowing a user to directly view a real space object in front of the eye while projecting and displaying various kinds of necessary information using a half mirror or the like, or a video see-through type displaying an image of a real space object in front of the eye captured by the out-camera 133 together with various kinds of information on the display 131 such as a liquid crystal panel. Both of them are designed to capture images of a field-of-view condition in front of the eyes by the out-camera 133 and acquire the data thereof.

The in-camera 134 captures images of a region different from an image acquisition region of the out-camera 133. For example, the in-camera 134 captures images of the eye of the user. In the present embodiment, the in-camera 134 functions not only as a processor that performs line-of-sight identification processing but also as a line-of-sight detection sensor.

The line-of-sight detection sensor includes a right line-of-sight detection section and a left line-of-sight detection section, which detect the line of sight of the right eye and the line-of-sight of the left eye, respectively. Note that a well-known technique commonly used as the eye tracking processing may be employed to detect the line of sight. For example, in a method using corneal reflection, irradiating an infrared LED (light emitting diode) to the face, capturing an image thereof using an infrared camera, and using a position on the cornea of the reflected light (corneal reflection) obtained by irradiation of the infrared LED as a reference point enables detection of a line of sight based on a position of the pupil with respect to the position of the corneal reflection. In this case, an infrared camera and an infrared LED are provided.

The audio processing device 140 is an audio processor that processes sounds, and includes a speaker 141 and a microphone 143.

The speaker 141 outputs an audio signal processed by the audio signal processing section to the outside. The audio signal processing section is an audio signal processor. In the case of the HMD 100, for example, a headphone may be used.

The microphone 143 converts voices of a user or the like into audio data and inputs the same. For example, the microphone 143 may include an ambient microphone and a voice microphone. These microphones collect ambient sounds and voices of the user 501. The microphone 143 may be connected to a headphone which is worn on the ear of the user 501 so as to acquire the sounds provided to the user 501.

The sensor 150 is a group of sensors for detecting the condition of the HMD 100. In the present embodiment, the sensor 150 includes a GPS (Global Positioning System) receiver 151, a gyro sensor 152, a geomagnetic sensor 153, an acceleration sensor 154, and a depth sensor 155. Providing the group of sensors enables detection of the position, motion, tilt, direction, and the like of the HMD 100. The depth sensor 155 acquires distance information from the HMD 100 to an object. Note that other sensors may be further provided.

The acceleration sensor 154 is a sensor for detecting the acceleration, which expresses the change in speed per unit time, and can capture the motion, vibration, impact, and the like. The gyro sensor 152 is a sensor for detecting the angular velocity in the rotational direction, and can capture the state of the vertical, horizontal, and oblique attitudes. Using the acceleration sensor 154 and the gyro sensor 152 mounted on the HMD 100 enables detection of the motion of the HMD 100.

The geomagnetic sensor 153 is a sensor for detecting the magnetic force of the earth, and detects the orientation in which the HMD 100 is directed. In the case of using a three-axis sensor capable of detecting the geomagnetism in the front and rear direction, left and right direction, and further upper and lower direction, capturing the geomagnetic change with respect to the motion of the HMD 100 enables detection of the motion of the HMD 100. They may be used to determine whether the icon 420 on the display 231 of the smartphone 200 can be viewed through the HMD 100.

The depth sensor 155 is a sensor capable of capturing the shape of a target such as a human or an object as a three-dimensional object. The depth sensor 155 may be a LiDAR (Light Detection and Ranging) sensor configured to irradiate a laser beam such as an infrared ray onto the target, measure a scattered light which has been reflected, and analyze and detect the distance to the target at a long distance and the state of the target, a TOF (Time Of Flight) sensor configured to measure a reflected time of a pulse light irradiated onto the target for each pixel to obtain the distance, or a millimeter wave radar configured to emit radio waves in the millimeter wave band, capture the reflected waves, and detect the distance to the target and the state of the object. The depth sensor 155 is used to measure, for example, the distance to the smartphone 200.

The communication device 160 is a communication interface for wirelessly communicating with other information terminals such as the smartphone 200 in the vicinity and a SW 300 which will be described later by the near field communication, wireless LAN, or base station communication. In the wireless communication, for example, icon touch information on the smartphone 200, application information indicating an application to be started, and file data to be played by the active application are transmitted and received therebetween via a transmission and reception antenna.

The communication device 160 includes a LAN (Local Area Network) communication interface (I/F) 161, a telephone network communication I/F 162, and a BT (Bluetooth communication I/F) 163. The LAN communication I/F 161 is wirelessly connected to an internet access point for wireless communication to transmit and receive data. The telephone network communication I/F 162 realizes the telephone communication (call) and data transmission and reception by wireless communication with a base station of a mobile telephone communication network. The BT communication I/F 163 is an interface for communicating with an external device according to the Bluetooth standard. The LAN communication I/F 161, the telephone network communication I/F 162, and the BT communication I/F 163 include encoding circuit, decoding circuits, and antennas, respectively. The communication device 160 may further include an infrared communication I/F or the like.

To realize the near field communication, instead of using Bluetooth (registered trademark), for example, IrDA (Infrared Data Association, registered trademark), Zigbee (registered trademark), or HomeRF (Home Radio Frequency, registered trademark) may be used. Alternatively, a wireless LAN such as Wi-Fi (registered trademark) may be used. To realize the base station communication, long-distance wireless communication such as W-CDMA (Wideband Code Division Multiple Access) or GSM (registered trademark) (Global System for Mobile communications) may be used. Note that using an ultra-wideband system (Ultra Wide Band:

UWB) to detect the positional relationship between the terminals and their orientations enables detection and determination as to whether the icon 420 on the display screen of the smartphone 200 can be viewed through the HMD 100.

As a means of wireless communication, the communication device 160 may use other approaches such as optical communication using sound waves. In this case, a light emission and reception section and a sound wave output and input section are used instead of a transmission and reception antenna.

The extended interface section 105 is a group of interfaces for extending the functions of the HMD 100, and in the present embodiment, the extended interface section 105 includes a charging terminal, a video and audio interface, a USB (Universal Serial Bus) interface, a memory interface, and the like. The video and audio interface inputs video signals and audio signals output from an external video and audio output device, and outputs video signals and audio signals to an external video and audio input device. The USB interface is used for connection to SB devices. The memory interface is used for connection with a memory card and other memory media and thus transmission and reception of data.

The vibrator 107 is a vibrator that is controlled by the main processor 111 to generate vibration. The vibrator 107 converts the notification information to the user 501 into vibration. The vibrator 107 generates the vibration at the head of the user 501 who is closely wearing the HMD 100, thereby reliably letting the user 501 to know the notification.

FIG. 5 is a hardware configuration diagram of the smartphone 200 according to the present embodiment. As illustrated in FIG. 5, the smartphone 200 of the present embodiment includes a main processor 201, a system bus 202, a memory and storage 210, an operation acceptance device 220, an image processing device 230, an audio processing device 240, a sensor 250, a communication device 260, an extended interface (I/F) section 205, a timer 206, and a vibrator 207.

The details of each of the devices are basically the same as those of the corresponding devices of the HMD 100. However, in the case of the smartphone 200, the operation acceptance device 220 further includes a touch panel 223. The touch panel 223 includes a touch panel 123 that is arranged to be superimposed on the display 231. Inputting of an instruction may be accepted via, for example, a keyboard connected to the extended interface section 205.

The display 231 is formed with, for example, a liquid crystal panel, and displays the notification information to the user 501 such as information about the remaining battery capacity, various alarms, and time, and also displays an icon of an application to be started and an execution status of the application. The operation acceptance device 220 is, for example, a touch pad type input means employing, for example, a static capacitance sensor, and detects the approach or touch operation by a finger, a touch pen, or the like as an operation input. Using the touch pad enables the user 501 to input and set his or her desired information and also easily select and designate an icon of an application or a file on the display 231 by a touch operation.

[Functional Blocks]

Figure 6A:
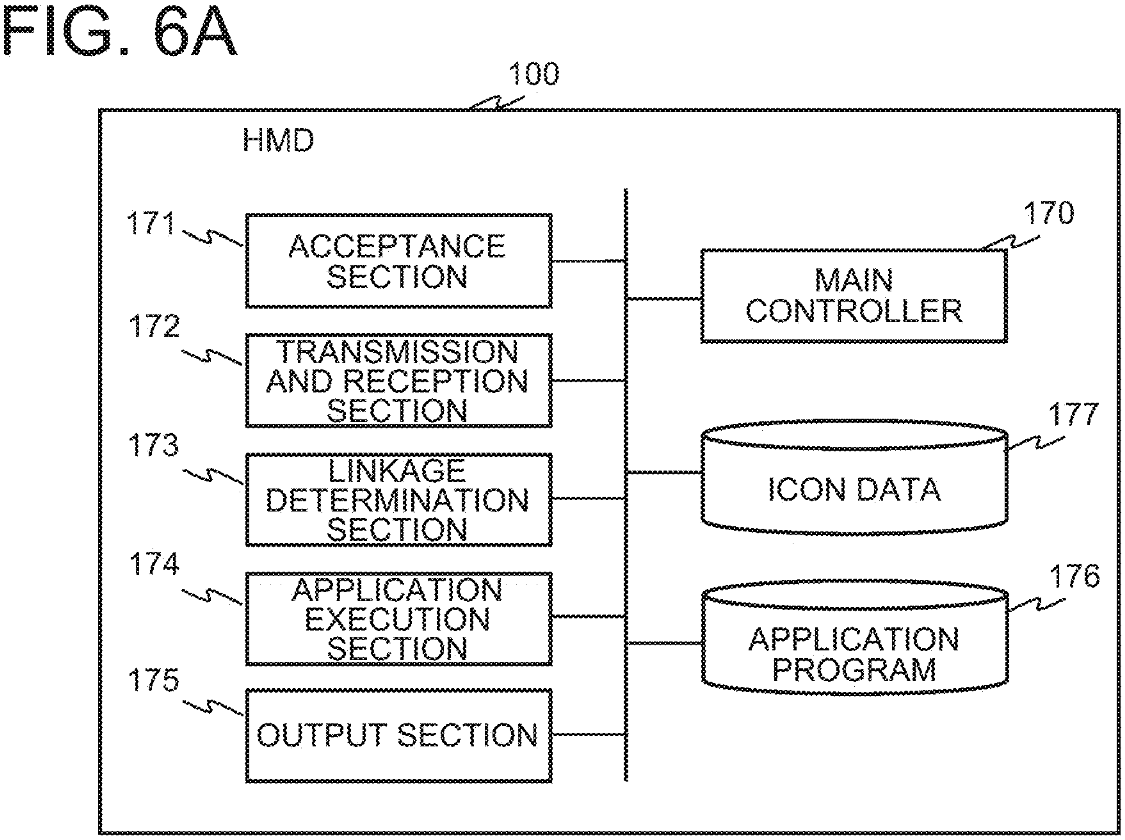
FIG. 6(*a*) and FIG. 6(*b*) are functional configuration diagrams of the head-mounted display and smartphone according to the first embodiment, respectively.
Figure 6B:
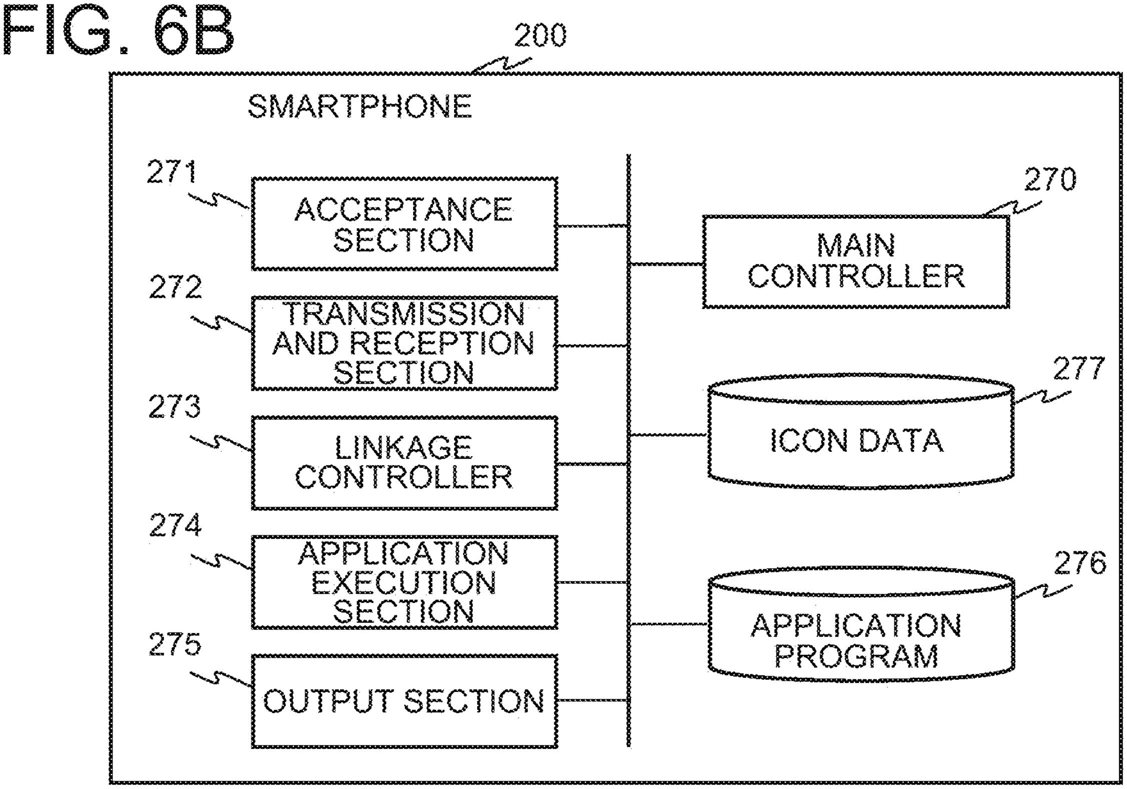

Next, functional configurations the HMD 100 and smartphone 200 of the present embodiment will be described, respectively. FIG. 6(*a*) and FIG. 6(*b*) are block diagrams of the functions, in particular related to the present embodiment, of the HMD 100 and smartphone 200 according to the present embodiment, respectively.

As illustrated in FIG. 6(*a*), the HMD 100 includes a main controller 170, an acceptance section 171, a transmission and reception section 172, a linkage determination section 173, an application execution section 174, an output section 175, an application program storage 176, and an icon data storage 177.

The main controller 170 controls the operations of each of the sections of the HMD 100.

The acceptance section 171 accepts an instruction from the user 501. In the present embodiment, the main processor 111 operates the operation acceptance device 120, thereby realizing the functions of the acceptance section 171. In the present embodiment, the acceptance section 171 accepts, for example, an instruction to start an application.

The transmission and reception section 172 transmits and receives data to and from an external device. In the present embodiment, the main processor 111 operates the communication device 160, thereby realizing the functions of the transmission and reception section 172. In the present embodiment, transmission and reception of data to and from the smartphone 200 is realized via the transmission and reception section 172.

The linkage determination section 173 realizes the linkage processing with the smartphone 200. In the present embodiment, the linkage determination section 173 determines whether the linked state, in which the smartphone 200 is operable in a linkage operation mode which will be described later, is established. In the present embodiment, as illustrated in FIG. 2(*a*), the linkage determination section 173 causes the linkage visual field 101*a* to be displayed on the display 131 and analyzes the images captured by the out-camera 133 so as to determine whether the predetermined placement state is satisfied based on the displayed content.

The linkage visual field 101*a* is set in a portion of an area within the field of view which can be viewed by the user 501 through an aperture (lens portion) of the HMD 100 or the display area of the display 131. Note that the linkage visual field 101*a* can be set to the entire range of the field of view which can be viewed by the user 501 through the HMD 100 based on change in the configuration of the device, setting values, or the like.

As illustrated in FIG. 2(*a*), the linkage determination section 173 determines that the predetermine placement state is satisfied when the icon 420 of a predetermined application on the display of the smartphone 200 is included in the captured images. The predetermined application is, for example, an application notified as a target by the smartphone 200. As will be described later, upon receiving the selection of the predetermined icon 420 made by the user 501, the smartphone 200 transmits the information identifying the application associated with the icon 420 (application identification information) to the HMD 100. Based on the application identification information, the HMD 100 identifies the icon 420 associated with the application identified by the received application identification information.

In the predetermined placement state, the linkage determination section 173 further determines whether a program of the application notified as a target by the smartphone 200 has been installed in the HMD 100. Upon detecting that it has been installed, the linkage determination section 173 determines that the linked state is established. That is, the linkage determination section 173 of the present embodiment determines that the linked state is established when the predetermined placement state has been satisfied and also that the program of the application corresponding to the icon operated by the user 501 has been installed in the HMD 100.

Upon determining that the linked state is established, the linkage determination section 173 transmits the information indicating that the linked state is established, that is, transmits a linked state signal to the smartphone 200. On the other hand, upon determining that the linked state is not established, the linkage determination section 173 transmits a non-linked state signal indicating that the non-linked state is satisfied to the smartphone 200. However, the linkage determination section 173 may not have to transmit the non-linked state signal.

The HMD 100 stores, in the icon data storage 177, the shape data of the icon 420 of the application installed in the own terminal in advance as icon data. The icon data storage 177 retains the shape information of the icon 420 associated with the application identification information. The linkage determination section 173 refers to the icon data storage 177 to determine whether the shape data associated with the received application identification information is stored therein. When it is stored, the linkage determination section 173 extracts the shape data and determines whether an area corresponding to the linkage visual field 101*a* includes an image area matching the extracted shape data.

When the shape data associated with the received application identification information is not stored in the icon data storage 177, the linkage determination section 173 determines that the non-linked state is satisfied. Furthermore, when the shape data is stored but the area of the captured image corresponding to the linkage visual field 101*a* does not include the image area matching the extracted shape data, the linkage determination section 173 determines that the non-linked state is satisfied. On the other hand, when the shape data is stored and the image area matching the extracted shape data is found, the linkage determination section 173 determines that the linked state is established.

The linkage determination section 173 makes determination as to whether the captured image includes therein the shape corresponding to the display of the smartphone 200 and the shape of the icon 420 by pattern matching or the like.

The application execution section 174 is an application execution section that starts and executes an application when the acceptance section 171 accepts an instruction to start the application. The program of the application to be executed is stored in the application program storage 176.

The output section 175 outputs a result of execution of the application. In the present embodiment, the execution result is, for example, displayed on the display 131 or output to the speaker 141 by audio output.

The application program storage 176 retains application programs.

The icon data storage 177 retains, as icon data, the shape data of the icon 420 for accepting an instruction to execute the application program. The icon data is stored in association with the application. Note that the shape data is not limited to a physical shape (pattern) or an image, but may be text data or the like. Even when failing to identify an application based on the pattern, the linkage determination section 173 can identify the application based on accompanying text data.

The main processor 111 loads a program stored in a ROM 114 onto a RAM 113 and executes it, whereby the functions described above are realized. The application program storage 176 and the icon data storage 177 are constructed in the memory and storage 110.

Next, the functions of the smartphone 200 according to the present embodiment will be described. FIG. 6(*b*) illustrates functional blocks of the smartphone 200.

As illustrated in FIG. 6(*b*), the smartphone 200 according to the present embodiment includes a main controller 270, an acceptance section 271, a transmission and reception section 272, a linkage controller 273, an application execution section 274, an output section 275, an icon data storage 277, and an application program storage 276.

The main controller 270 controls the operations of each of the sections of the smartphone 200.

The acceptance section 271 accepts an instruction from the user 501. In the present embodiment, the main processor 211 operates the operation acceptance device 220, thereby realizing the functions of the acceptance section 271. In the present embodiment, the acceptance section 271 accepts, for example, various operation instructions such as an instruction to start an application.

The transmission and reception section 272 transmits and receives data to and from an external device. In the present embodiment, the main processor 211 operates the communication device 260, thereby realizing the functions of the transmission and reception section 272. In the present embodiment, transmission and reception of data to and from the HMD 100 is realized via the transmission and reception section 272.

The linkage controller 273 decides an operation mode of the smartphone 200 so as to cause the smartphone 200 to operate in the operation mode as decided. In the present embodiment, the operation mode includes two types, namely, an independent operation mode for executing an application by the smartphone 200 independently and a linkage operation mode for executing the application with the smartphone 200 and the HMD 100 being linked with each other.

The linkage operation mode is an operation mode executed in the linked state. During the linkage operation mode, the linkage controller 273 decides an execution device (execution terminal) for executing an application. In the present embodiment, in the linkage operation mode, the HMD 100 is decided as the execution device.

That is, in the linkage operation mode, upon receiving an instruction to start the application from the user 501, for example, by means of touching of the icon 420, the smartphone 200 transmits the instruction to start the application to the HMD 100 being linked therewith. In the present embodiment, the own device does not execute the application.

In the present embodiment, the linkage controller 273 determines that the linked state is established upon receiving the linked state signal from the HMD 100, and then causes the smartphone 200 to operate in the linkage operation mode. On the other hand, upon receiving the non-linked state signal, the linkage controller 273 causes the smartphone 200 to operate in the independent operation mode.

The independent operation mode is an operation mode for, upon receiving an instruction to start an application from the user 501, causing the own device to start and execute the application.

The application execution section 274 is a second application execution section that executes an application on the smartphone 200. In the present embodiment, when the acceptance section 171 accepts an instruction to start an application and the linkage controller 273 determines that the operation mode is the independent operation mode, the application execution section 274 executes the application. The program of the application to be executed is stored in the application program storage 276.

The output section 275 outputs a result of execution of the application executed by the application execution section

274. In the present embodiment, the execution result is, for example, output on the display 231 or to the speaker 241.

The application program storage 276 retains application programs. The icon data storage 277 retains icons for receiving instructions to execute the application programs. The icons are stored in association with the applications, respectively.

The main processor 211 loads a program stored in a ROM 214 onto a RAM 213 and executes the program, whereby the functions described above are realized. The application program storage 276 and the icon data storage 277 are constructed in the memory and storage 210.

[Processing Flow]

Figure 7:
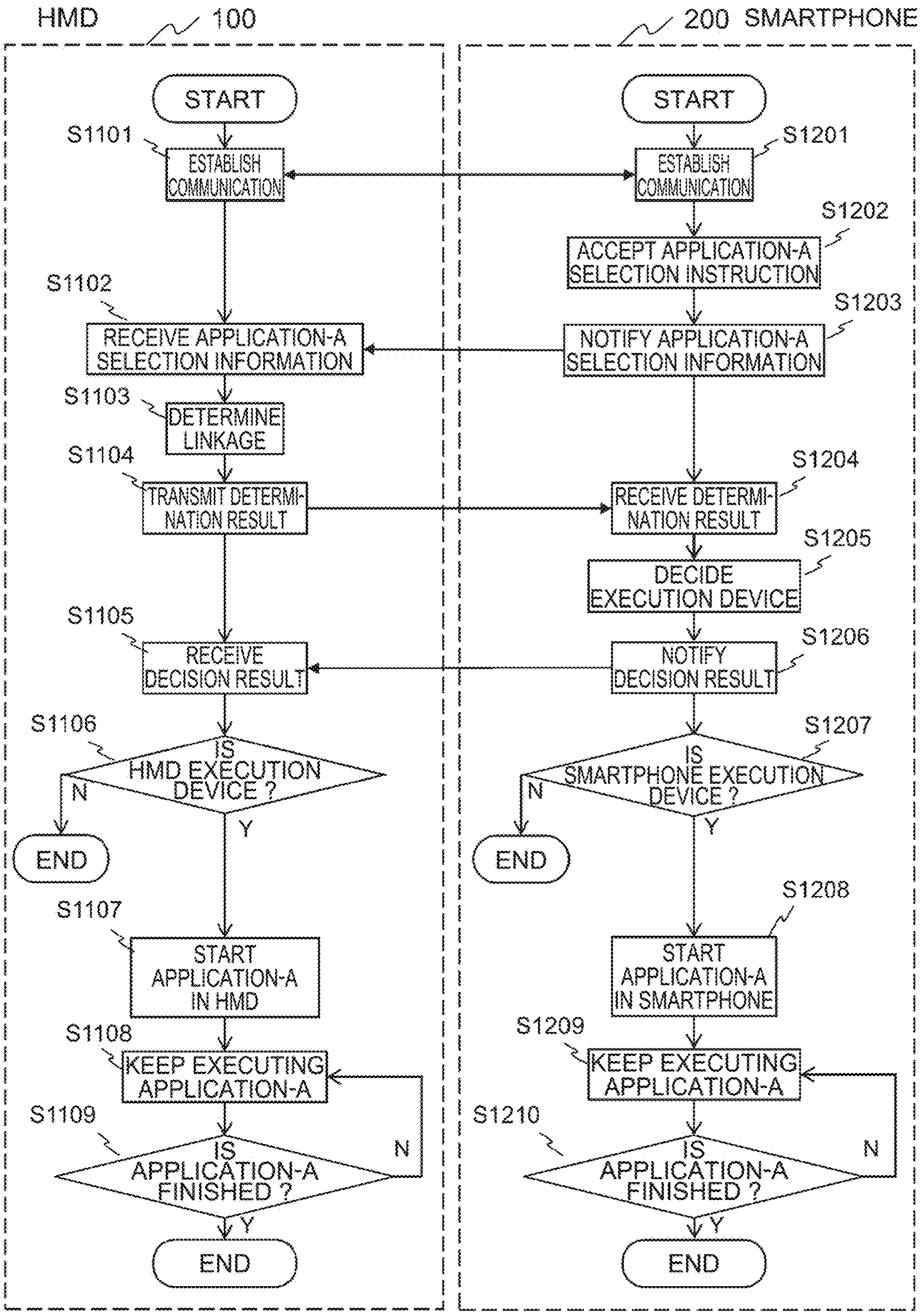
FIG. 7 illustrates an exemplary flowchart of the application linkage processing according to the first embodiment.

Next, a flow of the application linkage processing in the information processing system 500 according to the present embodiment will be described. In the present embodiment, the HMD 100 and the smartphone 200 are linked with each other, and an application of the HMD 100 is made started. FIG. 7 is a diagram for explaining a flow of the application linkage processing.

This processing starts when the HMD 100 and the smartphone 200 are ready for near field communication. In the following processing flow, the main controller 170 of the HMD 100 and the main controller 270 of the smartphone 200 will be referred to as the HMD 100 and the smartphone 200, respectively.

Firstly, the smartphone 200 and the HMD 100 establish communication therebetween (step S1101, step S1201). In the present embodiment, the smartphone 200 and the HMD 100 cause the transmission and reception section 172 and transmission and reception section 272 to transmit and receive data via, for example, the BT communication I/F 163 and BT communication I/F 263 to establish the communication.

The smartphone 200 causes the display 231 to display the icon 420 of the application which can be started on the smartphone 200. The smartphone 200 receives a selection instruction from the user 501 (step S1202). The acceptance section 271 of the smartphone 200 detects, via the touch panel 223, a touch operation on the icon 420 associated with the selected application and displayed on the display 231. Here, for example, it is assumed that the application A is selected by the touch operation.

The transmission and reception section 272 of the smartphone 200 notifies the HMD 100 that the application A has been selected (selection information) via the BT communication I/F 263 (step S1203). The selection information includes the application identification information identifying the selected application (in this case, the application A).

Upon receiving the selection information on the application A from the smartphone 200 via the transmission and reception section 172 (step S1102), the linkage determination section 173 of the HMD 100 determines whether the own terminal (HMD 100) and the terminal which has transmitted the selection information (smartphone 200) are in the linked state (step S1103). Here, the linkage determination section 173 makes the determination as to whether the program of the application A has been installed in the own device, and also makes the determination as to whether both the terminals are in the predetermined placement state. Either of the determination may be made first. When the program of the selected application A has been installed and the smartphone 200 and the predetermined placement state is satisfied, the linkage determination section 173 determines that the linked state is established. On the other hand, in the other cases, the linkage determination section 173 determines that the non-linked state is established.

The HMD 100 sends back, to the smartphone 200, a result of determination as to whether which of the linked state or the non-linked state is established, that is, transmits either the linkage signal or the non-linkage signal (step S1104).

Upon receiving the determination result via the transmission and reception section 272 (step S1204), the linkage controller 273 of the smartphone 200 decides an execution device in accordance with the determination result (step S1205). Here, the linkage controller 273 decides use of the HMD 100 as the execution device when the determination result indicates the linked state, and decides use of the smartphone 200 as the execution device when the determination result indicates the non-linked state.

The linkage controller 273 of the smartphone 200 notifies the HMD 100 of a result of decision through the transmission and reception section 272 (step S1206). The HMD 100 receives the result of decision (step S1105).

In accordance with the result of decision, the smartphone 200 or the HMD 100 executes the application A.

When it is decided to use the smartphone 200 as the execution device (step S1207), the application execution section 274 of the smartphone 200 starts the application A installed in the smartphone 200 (step S1208), keeps executing the application A until the application A is finished (step S1209, step S1210), and then ends the processing. For example, in the case of executing the application A which is, for example, an application for playing music, the smartphone 200 ends the processing at the time when the data is played to the end. The smartphone 200 may end the processing upon receiving an instruction to end the playing via the acceptance section 271.

On the other hand, when it is not decided to use the smartphone 200 as the execution device, the smartphone 200 terminates the processing as it is.

In the same manner as above, when it is decided to use the HMD 100 as the execution device (step S1106), the application execution section 174 of the HMD 100 starts the application A on the HMD 100 (step S1107), keeps executing the application A until the application A is finished (step S1108, step S1109), and then ends the processing. Note that, in many cases, the HMD 100 provides an instruction to end the application A.

On the other hand, when it is decided to use the HMD 100 as the execution device, the HMD 100 terminates the processing as it is.

For example, in the case of executing the application A which is, for example, an application for playing music, images, documents, and the like, the HMD 100 starts and executes the application A so as to realize playing of music, images, documents, and the like using the display 131, the speaker 141, and the like. The HMD 100 ends the processing upon receiving an operation to instruct end of the playing via the operation acceptance device 120. The HMD 100 may end the processing at the time when the data is played to the end.

In the case of executing the application A on the HMD 100, an instruction to end the application A may be received by the smartphone 200 and then transmitted to the HMD 100. For example, the smartphone 200 keeps displaying the selected icon 420, and upon receiving a touch operation on the icon 420 after being notified of the result of decision in S1206, determines that an instruction to end the application A has been received and then transmits the instruction to end the application A to the HMD 100.

As described above, the information processing system 500 according to the present embodiment is an information processing system 500 for linking a plurality of terminals to execute applications commonly provided in the plurality of terminals. The information processing system 500 comprises a first information terminal (HMD 100) and a second information terminal (smartphone 200) as the plurality of terminals. The smartphone 200 includes the acceptance section 271 that accepts an instruction to start the application and the linkage controller 273 that causes the smartphone 200 to operate in either the independent operation mode or the linkage operation mode. The HMD 100 includes the linkage determination section 173 that determines whether the linked state in which the smartphone 200 is operable in the linkage operation mode is established, and the output section 175 that outputs a result of execution of the application executed in the linkage operation mode. The independent operation mode is an operation mode for executing the application by the smartphone 200 independently, and the linkage operation mode is an operation mode for executing the application with the smartphone 200 and the HMD 100 being linked with each other. The linkage controller 273 of the smartphone 200 causes the smartphone 200 to operate in the linkage operation mode when the linkage determination section 173 determines that the linked state is established.

The linked state in which the smartphone 200 is operable in the linkage operation mode is determined depending on the placement of the HMD 100 and smartphone 200. That is, the acceptance section 271 of the smartphone 200 displays, on the display 231 (second display) of the smartphone 200, the icon 420 for accepting an instruction to start the application to accept the instruction to start the application via the icon 420. When the icon 420 displayed on the display 231 is included within the linkage visual field 101*a* set in advance on the display 131 of the HMD 100, the linkage determination section 173 of the HMD 100 determines that the linked state is established.

As described above, in the present embodiment, in the case where the first information terminal as exemplified by the HMD 100 and the second information terminal as exemplified by smartphone 200 are equipped with the same or corresponding applications and the applications can be started, which terminal is to start the application is automatically decided, based on the placement state of the first information terminal and second information terminal, by providing a touching operation on the icon 420 of the application displayed on the display 231 of the second information terminal which is as exemplified by the smartphone 200 and having better operability.

Specifically, the user 501 who wants to start an application installed in the HMD 100 looks at the icon thereof on the smartphone 200 through the HMD 100, which is an easy operation for the user 501, whereby the placement state for establishing the linked state can be easily satisfied. In the linked state, a user can start a desired application on the HMD 100 by touching an icon on the smartphone 200 having good operability. That is, this enables the user 501 to select an application that is desired to be started on the HMD 100 via the screen of the smartphone 200 which has high browsability and is easy in operation. Therefore, according to the present embodiment, it is possible to significantly improve the operability and usability of the HMD 100.

Furthermore, according to the present embodiment, the smartphone 200 having good operability is used to start the application on the HMD 100. Only satisfying the predetermined placement state in which the application icon on the smartphone 200 is visible through the field of view of the HMD 100 and touching the application icon on the smartphone 200 in this state can make the same or corresponding applications started in the HMD 100 by communication.

Thus, the user 501 can view the smartphone 200 to which he or she touch the icon of the desired application through the HMD 100, thereby allowing the user 501 to visually recognize his or her touch operation. This enables the application to be started reliably.

For example, setting the linkage visual field 101*a* at the center of the display area of the display 131 can further enhance the reliability and convenience for the user 501.

On the other hand, according to the present embodiment, even when the user 501 is wearing the HMD 100, causing the placement state of the HMD 100 and smartphone 200 not to fall within the predetermined placement state by making the application icon of the smartphone 200 not be viewed through the visual field of the HMD 100 enables the application mounted on the smartphone 200 per se to be started as it is. For example, even while the user 501 is wearing the HMD 100, he or she can start the application on the smartphone 200 by visually recognizing the icon 420 in a portion, which is within the field of view of the user 501 but is not determined to fall within the predetermined placement state (portion outside the linkage visual field 101*a*) and touching the icon 420. Furthermore, the smartphone 200 can start the application on the own terminal in the case where the HMD 100 and the smartphone 200 are not linked with each other, for example, in the event that the user 501 is not wearing the HMD 100 or the HMD 100 is turned off. As described above, according to the present embodiment, the user 501 can easily decide a terminal to be used for starting a desired application.

According to the present embodiment, whether an application is to be executed in the linkage operation mode for linking the smartphone 200 and the HMD 100 with each other and using the smartphone 200 as a device for operating the HMD 100, or in the independent operation mode for using the smartphone 200 independently can be set only by change of the placement state of the smartphone 200 and HMD 100. This realizes the information processing system 500 which reduces the burden on the user 501 and provides high flexibility and high operability.

Note that the second information terminal may be, other than the smartphone 200, for example, a tablet, a smartwatch, or a PC as long as it is an information terminal capable of displaying icons of applications or those of files and receiving selection of an icon.

In the embodiment described above, the examples of applications to be executed are a music application, a video application, and the like, however, they are not limited thereto.

Second Embodiment

Next, a second embodiment of the present invention will be described. In the first embodiment, the HMD 100 determines whether the HMD 100 and the smartphone 200 are in the linked state, and the smartphone 200 decides an execution device. In the present embodiment, the HMD 100 performs the processing until the execution device is decided.

Hereinafter, the present embodiment will be described focusing on the features different from those of the first embodiment.

The hardware configurations of the HMD 100 and smartphone 200 are the same as those in the first embodiment. The same is applied to the functional configurations. However, the processes performed by the linkage determination section 173 and linkage controller 273 are different from those in the first embodiment.

In the same manner as in the first embodiment, the linkage determination section 173 of the HMD 100 according the present embodiment determines whether the HMD 100 and the smartphone 200 are in the linked state or the non-linked state. In the present embodiment, thereafter, the linkage determination section 173 decides an execution device.

Specifically, when determining that the linked state is established, the linkage determination section 173 decides use of the HMD 100 as the execution device, and when determining that the non-linked state is established, the linkage determination section 173 decides use of the smartphone 200 as the execution device.

When deciding use of the HMD 100 as the execution device, the linkage determination section 173 transmits a signal (operation mode instruction signal) indicating execution in the linkage operation mode to the smartphone 200. On the other hand, when deciding use of the smartphone 200 as the execution device, the linkage determination section 173 transmits an operation mode instruction signal indicating execution in the independent operation mode.

In the same manner as in the first embodiment, the linkage controller 273 of the smartphone 200 according to the present embodiment causes the smartphone 200 to operate in the operation mode as decided. However, unlike the first embodiment, the linkage controller 273 does not decide an operation mode, but causes the smartphone 200 to operate in the operation mode identified by the operation mode instruction signal transmitted from the HMD 100.

[Processing Flow]

Figure 8:
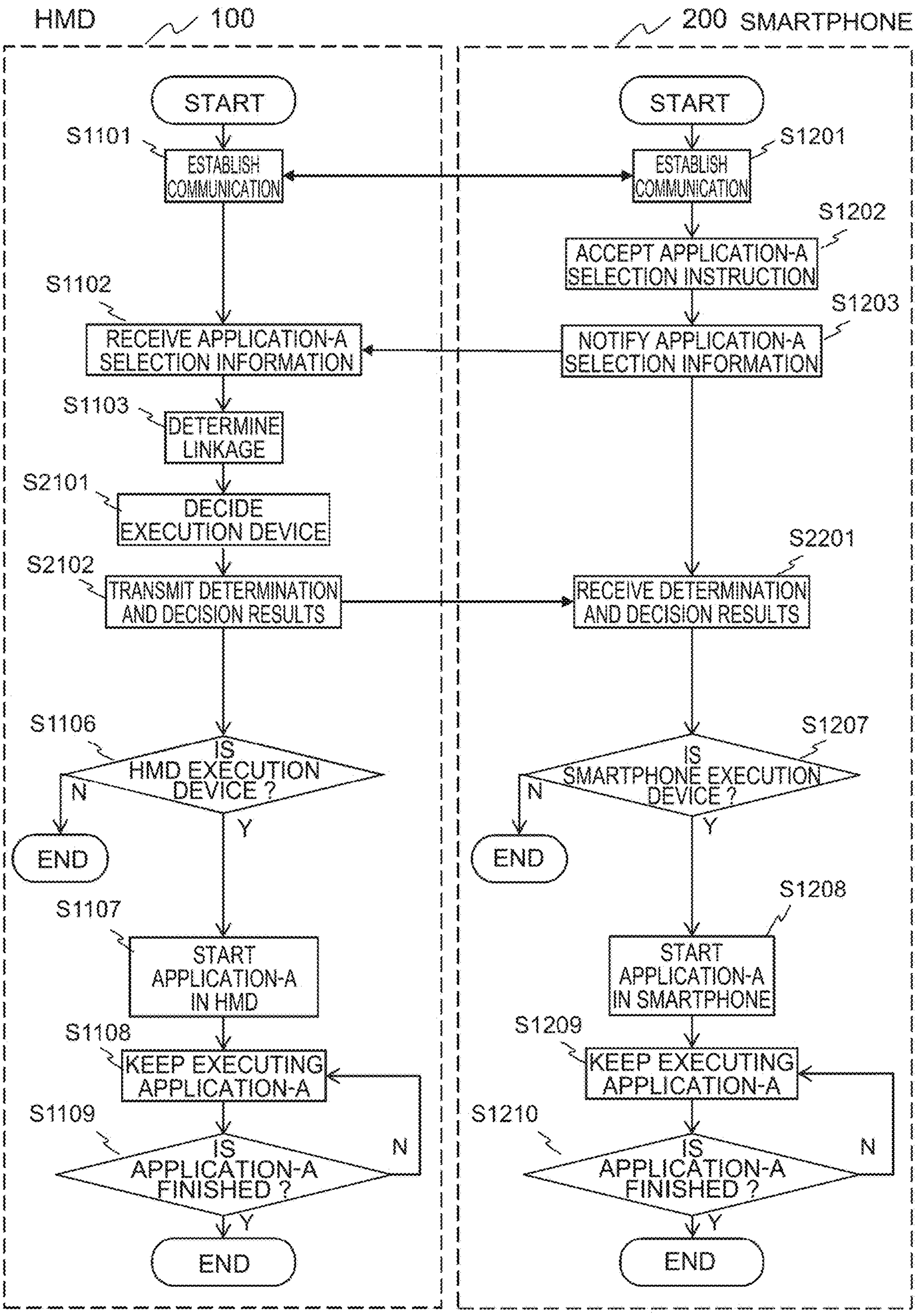
FIG. 8 illustrates an exemplary flowchart of the application linkage processing according to a second embodiment.

Hereinafter, a flow of the application linkage processing in the information processing system 500 according to the present embodiment will be described with reference to FIG. 8. The same processes as those in the application linkage processing of the first embodiment are provided with the same reference signs, and the repetitive explanation thereof will be omitted.

In the same manner as in the first embodiment, the linkage determination section 173 of the HMD 100 according to the present embodiment determines whether the HMD 100 and the smartphone 200 are in the linked state (step S1103). Thereafter, the linkage determination section 173 decides an execution device on which the application A is to be executed (step S2101). Here, when determining that the linked state is established, the linkage determination section 173 decides use of the HMD 100 as the execution device, and when determining that the non-linked state is established, the linkage determination section 173 decides use of the smartphone 200 as the execution device.

Then, the linkage determination section 173 transmits a result of decision together with a result of determination to the smartphone 200 (step S2102). That is, the linkage determination section 173 transmits the operation mode decision signal to the smartphone 200. Then, the linkage determination section 173 executes the process in step S1106 in accordance with the result of decision.

Upon receiving the result of decision (step S2201), the linkage controller 273 of the smartphone 200 executes the processes after step S1207 in accordance with the operation mode.

As described above, in the information processing system 500 of the present embodiment, when determining that the linked state is established, the linkage determination section 173 of the HMD 100 instructs the smartphone 200 to operate in the linkage operation mode.

As described above, according to the information processing system 500 of the present embodiment, as in the first embodiment, it is possible to provide a user-friendly system capable of realizing smooth linkage between the HMD 100 and the smartphone 200 without increasing the burden on the user 501.

Third Embodiment

Next, a third embodiment of the present invention will be described. In the present embodiment, the smartphone 200 determines whether the linked state is established and decides an execution device.

Hereinafter, the present embodiment will be described focusing on the features different from those of the first embodiment.

The hardware configurations of the HMD 100 and smartphone 200 are the same as those in the first embodiment. The same is applied to the functional configurations. However, the processes performed by the linkage determination section 173 and linkage controller 273 are different from those in the first embodiment.

Upon receiving the selection information on the application A indicating that the application A has been selected through the smartphone 200, the linkage determination section 173 of the HMD 100 according to the present embodiment determines whether the application A has been installed in the own device, and transmits a result of determination to the smartphone 200.

Upon receiving, from the HMD 100, the result of determination as to whether the application A has been installed, the linkage controller 273 of the smartphone 200 according to the present embodiment determines whether the HMD 100 and the own device are in the linked state and decides an execution device.

Figure 9:
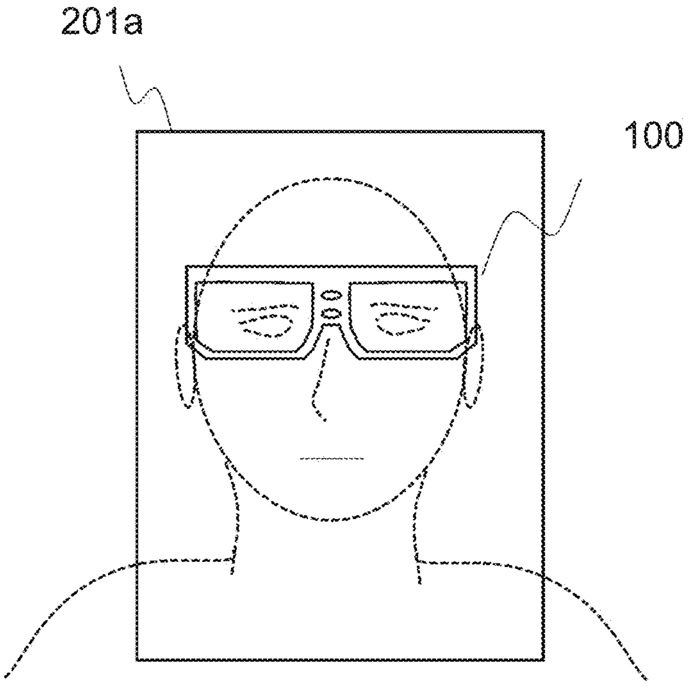
FIG. 9 is a diagram for explaining the linkage state determination approach according to a third embodiment.

The linkage controller 273, firstly, determines whether the HMD 100 and the smartphone 200 are in the predetermined placement. For example, as illustrated in FIG. 9, when the HMD 100 is present in an image capturing range 201*a* of the in-camera 234 of the smartphone 200, the linkage controller 273 determines that the predetermined placement is established. The smartphone 200 retains the shape of the HMD 100 as a pattern in advance, analyzes an image captured by the in-camera 234, and determines that the predetermined placement is satisfied when the pattern is present in the image corresponding to the image capturing range 201*a*. Note that the shape data of the HMD 100 may be transmitted for use from the HMD 100 to the smartphone 200 during communication.

Next, when determining that the HMD 100 and the smartphone 200 are in the predetermined placement state, the linkage controller 273 refers to the result of determination transmitted from the HMD 100 indicating whether the application A has been installed. The linkage controller 273 determines that the linked state is established when receiving a result indicating that the application A has been installed. On the other hand, when the HMD 100 and the smartphone 200 are not in the predetermined placement state, or when they are in the predetermined placement state but the application A has not been installed in the HMD 100, the linkage controller 273 determines that the non-linked state is established.

Then, the linkage controller 273 decides the execution device, and transmits a result of decision together with a result of determination regarding the placement state to the HMD 100. For example, when determining that the linked state is established, the linkage controller 273 decides use of the HMD 100 as the execution device, and when determining that the non-linked state is established, the linkage controller 273 decides use of the smartphone 200 as the execution device.

[Processing Flow]

Figure 10:
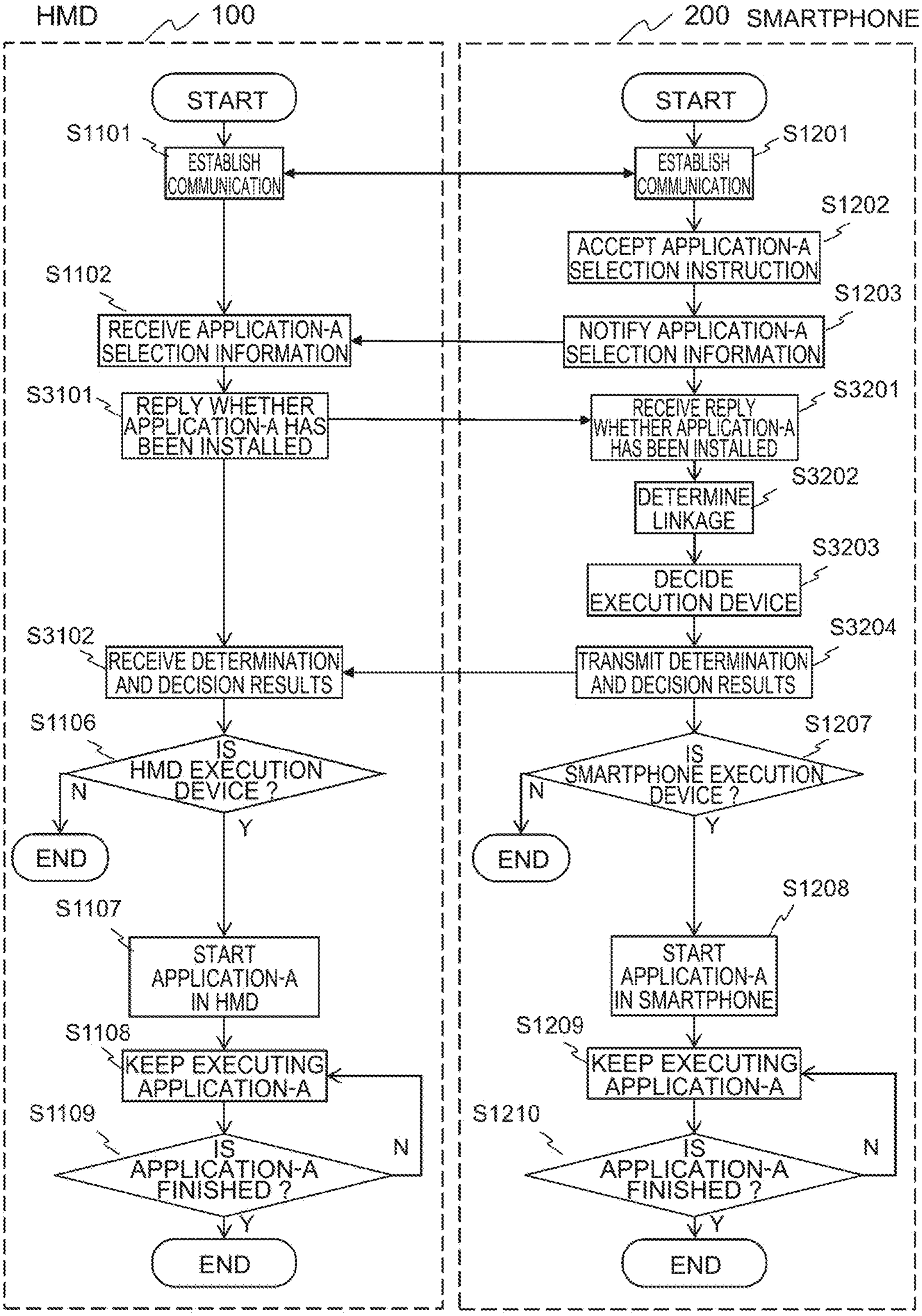
FIG. 10 illustrates an exemplary flowchart of the application linkage processing according to the third embodiment.

Hereinafter, a flow of the application linkage processing in the information processing system 500 according to the present embodiment will be described with reference to FIG. 10. The same processes as those in the application linkage processing of the first embodiment are provided with the same reference signs, and the repetitive explanation thereof will be omitted.

Upon receiving the selection information on the application A indicating that the application A has been selected through the smartphone 200 (step 31102), the linkage determination section 173 of the HMD 100 according to the present embodiment determines whether the application A has been installed in the own device and transmits a result of determination to the smartphone 200 (step S3101).

Upon receiving the determination result from the HMD 100 (step S3201), the linkage controller 273 of the smartphone 200 determines whether the linked state is established (step S3202). Here, as described above, the linkage controller 273 makes the determination above in accordance with the result of determination as to whether both the devices are in the predetermined placement state and the result of determination received from the HMD 100 (step S3202).

Then, the linkage controller 273 decides the execution device in accordance with the result of determination regarding the linked state (step S3203), and transmits a result of decision together with the result of determination regarding the linked state to the HMD 100.

Thereafter, the processes after step S1207 are executed in accordance with the result of decision.

Upon receiving the result of determination and the result of decision (step S3102), the HMD 100 executes the processes after step S1106 in accordance with the result of decision.

As described above, in the information processing system 500 according to the present embodiment, the linkage controller 273 of the smartphone 200 determines whether the linked state in which the smartphone 200 is operable in the linkage operation mode is established. When determining that the linked state is established, the linkage controller 273 causes the smartphone 200 to operate in the linkage operation mode.

As described above, according to the information processing system 500 of the present embodiment, as in the first embodiment, it is possible to provide a user-friendly information processing system capable of realizing smooth linkage between the HMD 100 and the smartphone 200 without increasing the burden on the user 501.

Fourth Embodiment

Next, a fourth embodiment of the present invention will be described. In the present embodiment, even in the case where the HMD 100 is decided as the execution device used to execute the selected application A, the smartphone 200 also executes the application A so as to accept an operation on the application A by the user 501.

Hereinafter, the present embodiment will be described focusing on the features different from those of the first embodiment.

The hardware configurations of the HMD 100 and smartphone 200 are the same as those in the first embodiment. The same is applied to the functional configurations. However, the processes performed by the linkage determination section 173 and linkage controller 273 are different from those in the first embodiment.

In the case where it is determined that the linked state is established, even when the HMD 100 is decided as the execution device, the linkage controller 273 of the smartphone 200 executes the application A while synchronizing it with the HMD 100.

Figure 11A:
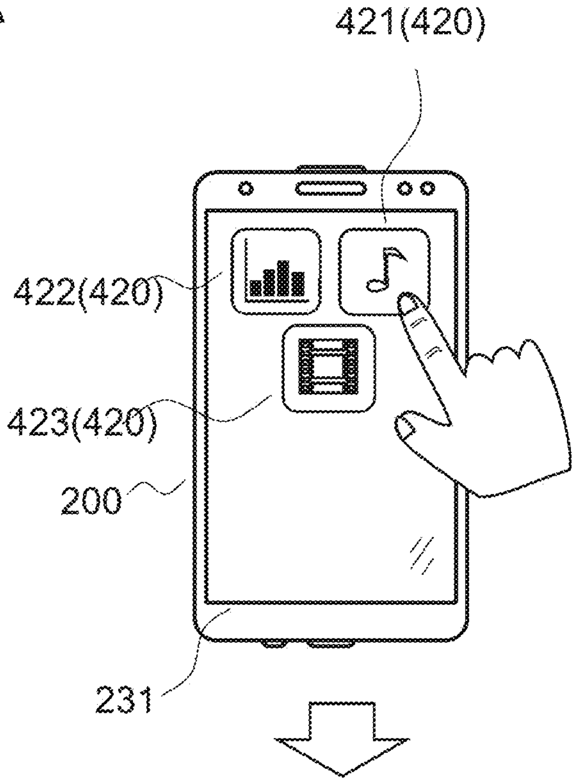
FIG. 11(*a*) and FIG. 11(*b*) are diagrams for explaining display content of a display of a smartphone according to a fourth embodiment.
Figure 11B:
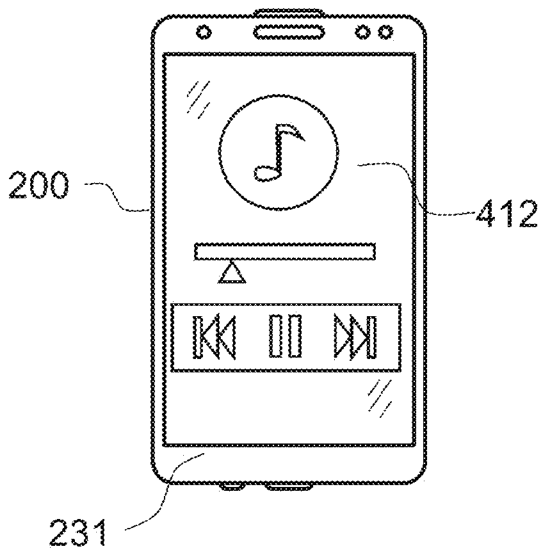

For example, as illustrated in FIG. 11(*a*), based on the selection of the icon 421 of the application A, the linkage controller 273 transmits an instruction to start the application to the HMD 100, and also causes the smartphone 200 to execute the application A. As illustrated in FIG. 11(*b*), the linkage controller 273 also causes the display 231 of the smartphone 200 to display an operation screen showing the application A is being executed. FIG. 11 illustrates an example where the application A is an application for playing music.

Upon receiving an operation on the application A such as pause, skip, reverse, or stop via the display 231 of the smartphone 200 in the state where the HMD 100 is decided as the execution device, the linkage controller 273 of the present embodiment transmits a signal (operation signal) indicating the received operation to the HMD 100.

Upon receiving the operation signal from the smartphone 200 via the transmission and reception section 172 while executing the application A, the linkage determination section 173 of the HMD 100 controls the application A in accordance with the operation signal.

[Processing Flow]

Hereinafter, a flow of the application linkage processing in the information processing system 500 according to the present embodiment will be described with reference to FIG. 12. The same processes as those in the application linkage processing of the first embodiment are provided with the same reference signs, and the repetitive explanation thereof will be omitted.

In the present embodiment, the approach according to any of the first to third embodiments may be used in the processing of determining whether the HMD 100 and the smartphone 200 are in the linked state and deciding an execution device in accordance with the determination. Here, this processing is referred to as the execution device decision processing.

The execution device decision processing is performed in step 34400 so as to decide the execution device to be used, and thereafter, the linkage controller 273 of the smartphone 200 instructs the application execution section 274 to start the application A. In response to this instruction, the application execution section 274 starts the application A (step S4201).

The following processes are performed depending on whether the execution device is the smartphone (step 31207). That is, in the case where the smartphone 200 is decided as the execution device, the processes after step 31209 are performed in the same manner as in the first to third embodiments.

On the other hand, in the case where the HMD 100 is decided as the execution device, the application execution section 274 executes the application A on its own device as well while synchronizing it with the HMD 100 (step S4202). Based on an operation on the application A accepted by the acceptance section 271 via the display 231 or the like (step S4203), the transmission and reception section 272 transmits an operation signal corresponding to the operation to the HMD 100. This continues until the application A is finished.

FIG. 12 illustrates an example where an operation to finish the application A is accepted.

Upon receiving the operation signal from the smartphone 200 via the transmission and reception section 172 while executing the application A, the application execution section 174 of the HMD 100 controls the application A in accordance with the operation signal. For example, as illustrated in FIG. 12, upon receiving the operation signal to instruct the application A to terminate the application (step S4101), the application execution section 174 shuts down the application A (step S4102) and then ends the processing.

As described above, in the information processing system 500 of the present embodiment, even in the linkage operation mode, the smartphone 200 executes the application on the own device as well while synchronizing it with the HMD 100. This enables the smartphone 200 to accept an operation on the application at any time while the application is being executed in the HMD 100.

That is, according to the present embodiment, in the case where the smartphone 200 and the HMD 100 are in the predetermined placement state, when the user 501 touches the icon of the application A on the smartphone 200, the application A is executed on the HMD 100. At this time, on the smartphone 200, the screen thereof is shifted to an operation screen of the application A so as to accept an operation on the application A being executed in the HMD 100. For example, the user touches the pause button on the operation screen displayed on the smartphone 200, whereby the playing of the application A being executed on the HMD 100 is paused.

As described above, according to the information processing system 500 of the present embodiment, as in the first embodiment, it is possible to provide a user-friendly system capable of realizing smooth linkage between the HMD 100 and the smartphone 200 without increasing the burden on the user 501. Furthermore, according to the present embodiment, even while the application is being executed on the HMD 100, a user is allowed to operate the application with the smartphone 200, thereby improving the usability and convenience.

The smartphone 200 does not have to fully control the application. For example, the smartphone 200 may be configured to control only the I/F portion so as to transmit, to the HMD 100, an operation signal corresponding to the operation as accepted, while the HMD 100 performs the subsequent processes. For example, the smartphone 200 displays operation buttons, receives an input of an operation via the operation buttons, and transmits an operation signal to the HMD 100. Then, the HMD 100 controls the application in accordance with the operation signal. This enables the user 501 to operate an application in the HMD 100 through the easy-to-use display of the smartphone 200 without wasting the advantages of the smartphone 200.

Fifth Embodiment

Next, a fifth embodiment of the present invention will be described. In the present embodiment, in the case where the HMD 100 is decided as the execution device in the linked state, the smartphone 200 transmits data necessary for execution of the application A to the HMD 100 before start of the application A in the HMD 100. The present embodiment is an embodiment in the case where the application A is an application for playing files or the like.

Hereinafter, the present embodiment will be described focusing on the features different from those of the first embodiment.

The hardware configurations of the HMD 100 and smartphone 200 are the same as those in the first embodiment. The same is applied to the functional configurations. However, the processes performed by the linkage determination section 173 and linkage controller 273 are different from those in the first embodiment.

The linkage controller 273 of the smartphone 200 according to the present embodiment transmits, to the HMD 100, data necessary for execution of the application A as selected in the case where the HMD 100 is decided as the execution device in the linked state, that is, in the linkage operation mode.

After receiving the data transmitted from the smartphone 200, the linkage determination section 173 of the HMD 100 starts and executes the application A on the own device.

[Processing Flow]

Figure 13:
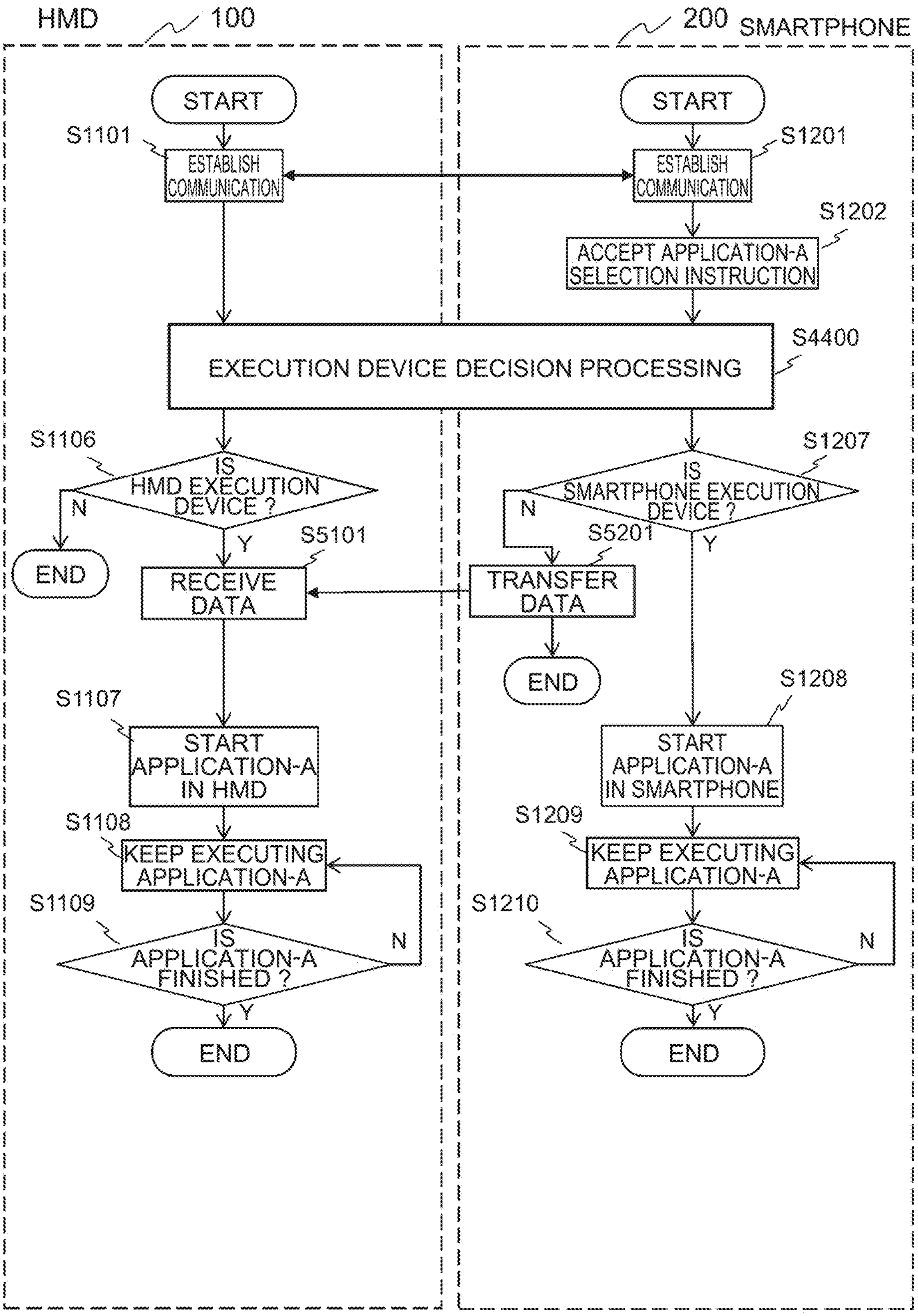
FIG. 13 illustrates an exemplary flowchart of the application linkage processing according to a fifth embodiment.

Hereinafter, a flow of the application linkage processing in the information processing system 500 according to the present embodiment will be described with reference to FIG. 13. The same processes as those in the application linkage processing of the first embodiment are provided with the same reference signs, and the repetitive explanation thereof will be omitted.

In the present embodiment, the approach according to any of the first to third embodiments may be used in the processing of determining whether the HMD 100 and the smartphone 200 are in the linked state and deciding an execution device to be used in accordance with the determination. Here, this processing is referred to as the execution device decision processing.

The execution device decision processing is performed in step S4400 so as to decide the execution device, and thereafter, the linkage controller 273 of the smartphone 200 controls the application A in accordance therewith.

That is, in the case where the HMD 100 is decided as the execution device, the linkage controller 273 causes the transmission and reception section 272 to transmit the data necessary in the processing for the application A to the HMD 100 (step S5201), and then ends the processing. On the other hand, in the case where the smartphone 200 is decided as the execution device, the linkage controller 273 performs the processes after step S1208.

In the case where the HMD 100 is decided as the execution device, upon receiving the data from the smartphone 200 (step 35101), the linkage determination section 173 causes the application execution section 174 to start the application A (step S1107), and executes the processes after step 31108.

As described above, in the information processing system 500 of the present embodiment, in the linkage operation mode, the linkage controller 273 of the smartphone 200 transmits data necessary for executing an application to the HMD 100, and then the HMD 100 executes the application using the data received from the smartphone 200.

As described above, according to the information processing system 500 of the present embodiment, as in the first embodiment, it is possible to provide a user-friendly system capable of realizing smooth linkage between the HMD 100 and the smartphone 200 without increasing the burden on the user 501.

Furthermore, in the present embodiment, the smartphone 200 retains the data necessary for executing an application and thus the HMD 100, whose storage capacity such as a memory is desired to be reduced, does not need to retain the data at all times. This can realize both execution of an application on the HMD 100 and reduction in the storage capacity.

Still further, for example, in the case where the application to be executed is an application for playing music, images, documents, and the like, the HMD 100 can play the data stored in the smartphone 200 using an application for playing equipped with the HMD 100. That is, the data above can be played with a more familiar device, which is convenient for users.

In the present embodiment, the example where the application to be executed is identified first and then the file data is transferred has been described. However, the present invention is not limited thereto. The smartphone 200 may transfer only the file data without identifying an application to be executed. In this case, the HMD 100 checks the received file data, and then starts an application for processing the file data.

In the case where the same files are stored in both the smartphone 200 and the HMD 100, the smartphone 200 transfers only the file designation information without transferring the data of the file so that the HMD 100 can play the file stored in the HMD 100. This can prevent delay in playing due to data transfer, and also can reduce power consumption.

Sixth Embodiment

Next, a sixth embodiment of the present invention will be described. In the present embodiment, even in the linked state, the smartphone 200 executes the application and transmits only the execution result to the HMD 100.

Hereinafter, the present embodiment will be described focusing on the features different from those of the first embodiment.

The hardware configurations of the HMD 100 and smartphone 200 are the same as those in the first embodiment. The same is applied to the functional configurations. However, the processes performed by the linkage determination section 173 and linkage controller 273 are different from those in the first embodiment.

The linkage controller 273 of the smartphone 200 executes the application A on the own device even in the case where, in the linked state, the HMD 100 is decided as the execution device. However, in the case where the HMD 100 is decided as the execution device, the smartphone 200 transmits the execution result to the HMD 100 instead of outputting it to the own device.

In the case where the HMD 100 is decided as the output device, the linkage determination section 173 of the HMD 100 controls the output section 175 to output the execution result (output information) of the application A received via the transmission and reception section 172. Note that if screens, processing, or the like specific to the application A are required to output the execution result, the HMD 100 starts the application A and executes the processing as well.

[Processing Flow]

Figure 14:
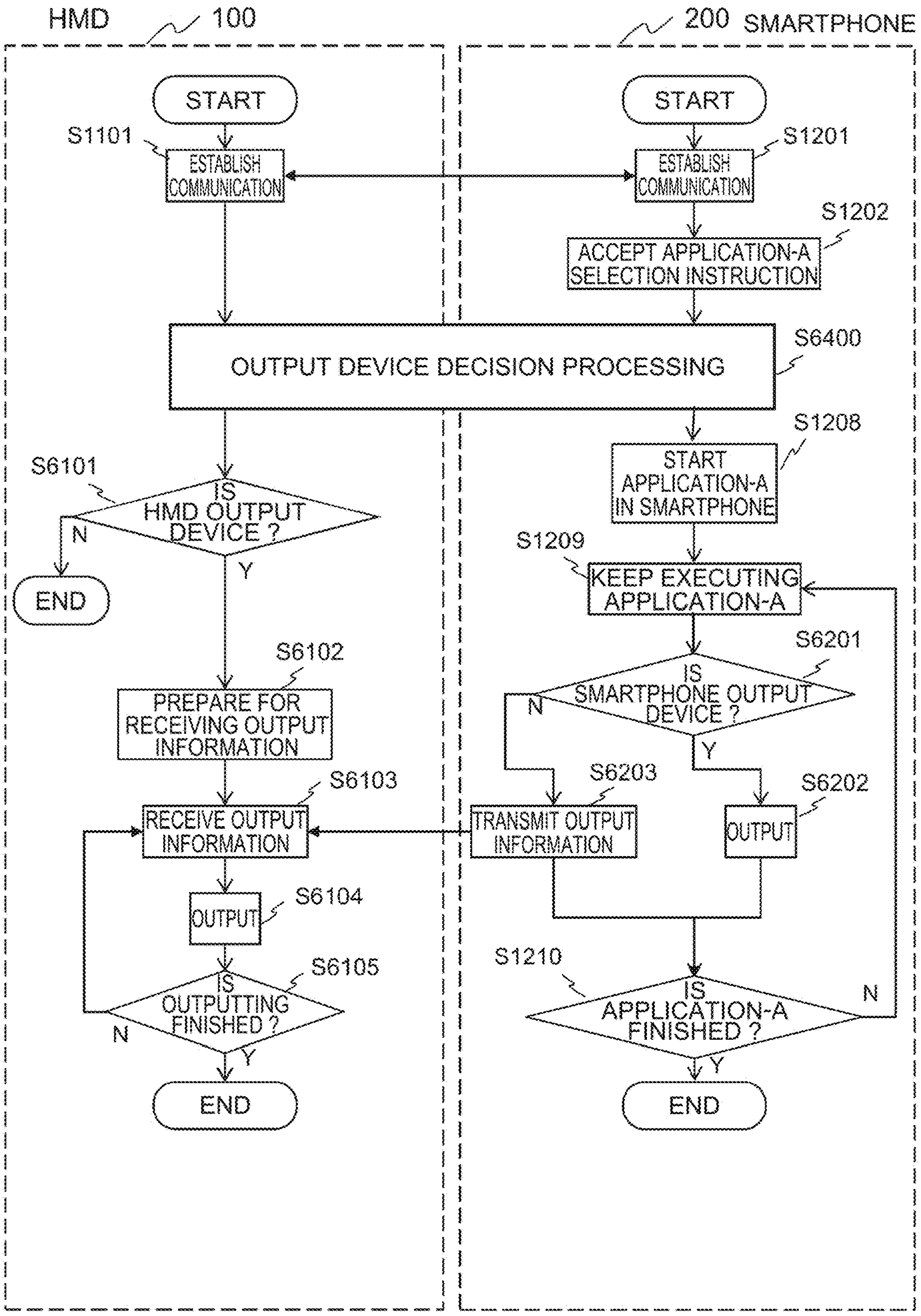
FIG. 14 illustrates an exemplary flowchart of the application linkage processing according to a sixth embodiment.

Hereinafter, a flow of the application linkage processing in the information processing system 500 according to the present embodiment will be described with reference to FIG. 14. The same processes as those in the application linkage processing of the first embodiment are provided with the same reference signs, and the repetitive explanation thereof will be omitted.

In the present embodiment, it is determined whether the HMD 100 and the smartphone 200 are in the linked state, and an output device that is an output destination of the application A is decided in accordance with the determination above. This output device decision processing is the same as the execution device decision processing of deciding an execution device according to any one of the first to third embodiments, and decides an output device instead of an execution device.

The output device decision processing is performed in step S6400 so as to decide an output device, and then the linkage controller 273 of the smartphone 200 instructs the application execution section 274 to start the application A. In response to this instruction, the application execution section 274 starts the application A (step S1208). Then, the linkage controller 273 causes the application execution section 274 to execute the application A (step S1209).

Before outputting the execution result, the application execution section 274 determines which of the smartphone 200 or the HMD 100 is decided as the output device in the output device decision processing (step S6201). In the case where the smartphone 200 is decided as the output device, the linkage controller 273 causes the output section 275 to output the execution result to the display 231, the speaker 241, and the like of the own device as it is (step S6202). The application execution section 274 continues these processes of step S1209 to step S6202 until the application A is finished, and thereafter, ends the processing.

On the other hand, in the case where the HMD 100 is decided as the output device, before outputting the execution result, the linkage controller 273 causes the transmission and reception section 272 to transmit, to the HMD 100, output information that is information to be output (step S6203).

In the case where the smartphone 200 is decided as the output device, the HMD 100 terminates the processing as it is (step S6101), and in the case where the HMD 100 is decided as the output device, the linkage determination section 173 instructs the transmission and reception section 172 to receive the output information, in other words, prepares for receiving the output information (step S6102).

Upon receiving the output information from the smartphone 200 (step S6103), the linkage determination section 173 causes the output section 175 to output the received output information (step S6104). The linkage determination section 173 keeps executing the processes of step S6103 and step S6104 until reception of the output information has been finished (step S6105), and thereafter, ends the processing. The linkage determination section 173 may be configured to determine that outputting of the output information has been finished, for example, when receiving an output information end signal, when a specified period of time passes since the output information cannot be received, or when communication with the smartphone is interrupted.

As described above, in the information processing system 500 of the present embodiment, in the case where the smartphone 200 operates in the linkage operation mode, the linkage controller 273 of the smartphone 200 executes the selected application and transmits the execution result to the HMD 100.

As described above, according to the information processing system 500 of the present embodiment, as in the first embodiment, it is possible to provide a user-friendly system capable of realizing smooth linkage between the HMD 100 and the smartphone 200 without increasing the burden on the user 501.

In particular, according to the present embodiment, for example, the user 501 touches the icon of a music application in the predetermined placement in which, for example, the user 501 views the smartphone 200 through the HMD 100, whereby the smartphone 200 executes the music software while transmitting only the audio playing data to the HMD 100 so as to allow the user 501 to listen to the music using a speaker (headphone) of the HMD 100. This does not require the HMD 100 to be mounted with an extra data memory or application for large-capacity content data such as video and music. That is, both the operation of the HMD 100 as if the HMD 100 started and played the music application and reduction in the mounting capacity can be realized.

Reduction in the storage capacity and required processing capacity of the HMD 100 enables reduction in the size and weight of the HMD 100. Furthermore, the present embodiment allows a user to operate the smartphone 200 even during the execution in the HMD 100, thereby improving the usability.

Seventh Embodiment

Figure 15:
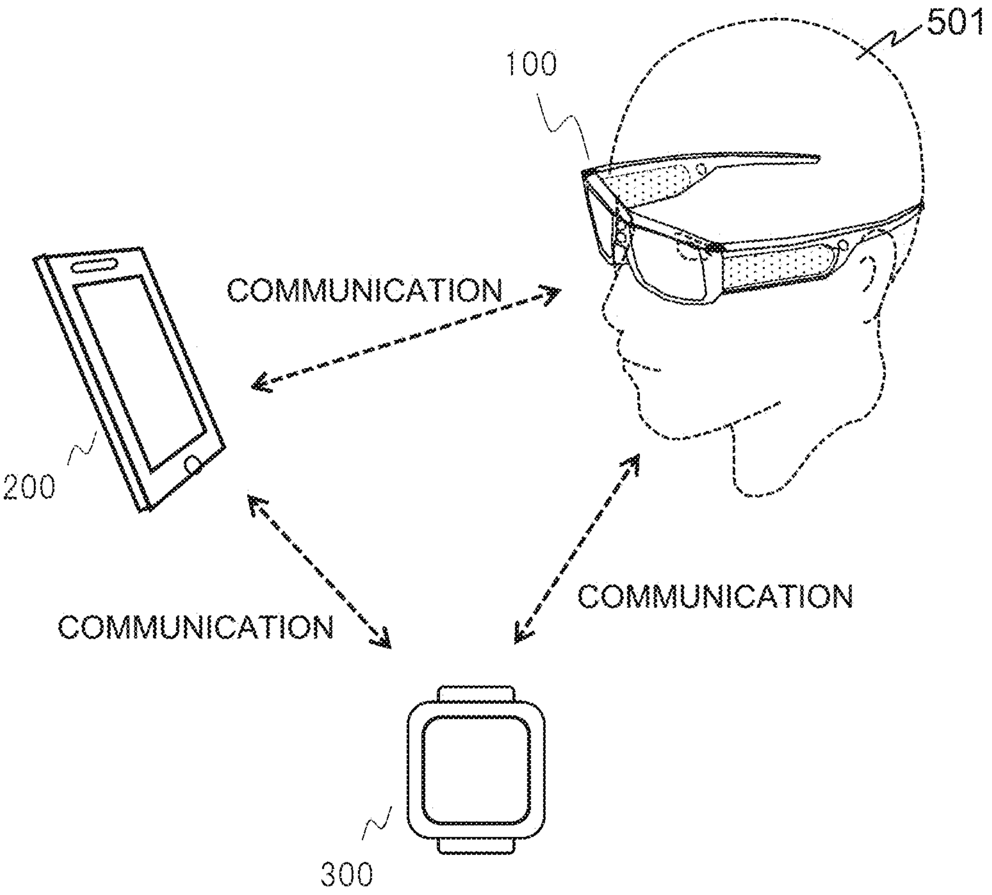
FIG. 15 is a diagram for explaining an outline of an information processing system according to a seventh embodiment.

Next, a seventh embodiment of the present invention will be described. As illustrated in FIG. 15, the information processing system 500 according to the present embodiment includes a first information terminal, a second information terminal, and a third information terminal, and these three information terminals are linked with each other to execute an application.

Hereinafter, the present embodiment will be described with reference to the example where the first information terminal is a smartwatch (SW 300), the second information terminal is the smartphone 200, and the third information terminal is the HMD 100.

In the present embodiment, the HMD 100 determines whether the smartphone 200 and the SW 300 are in the placement state in which they can be linked with each other. Upon receiving a result of determination, the smartphone 200 decides whether the selected application A is to be executed by its own device or the SW 300, in other words, whether to operate in the linkage operation mode or in the independent operation mode. Before deciding the operation mode, the smartphone 200 confirms in advance with the SW 300 whether the selected application A has been installed in the SW 300.

Hereinafter, the configuration of each device of the present embodiment will be described.

The hardware configurations of the HMD 100 and smartphone 200 are the same as those in the first embodiment. The same is applied to the functional configurations. However, the processes performed by the linkage determination section 173 and linkage controller 273 are different from those in the first embodiment.

The hardware configuration and functional blocks of the HMD 100 and those of the smartphone 200 according to the present embodiment are basically the same as those of the first embodiment. However, the processes performed by the linkage determination section 173 and linkage controller 273 are different from those in the first embodiment.

The HMD 100 according to the present embodiment only determines, as the third information terminal, whether a placement state in which the information terminals are able to be linked with other is established. That is, the linkage determination section 173 of the present embodiment determines whether the smartphone 200 and the SW 300 are in the placement state in which they are linked with each other.

Figure 16A:
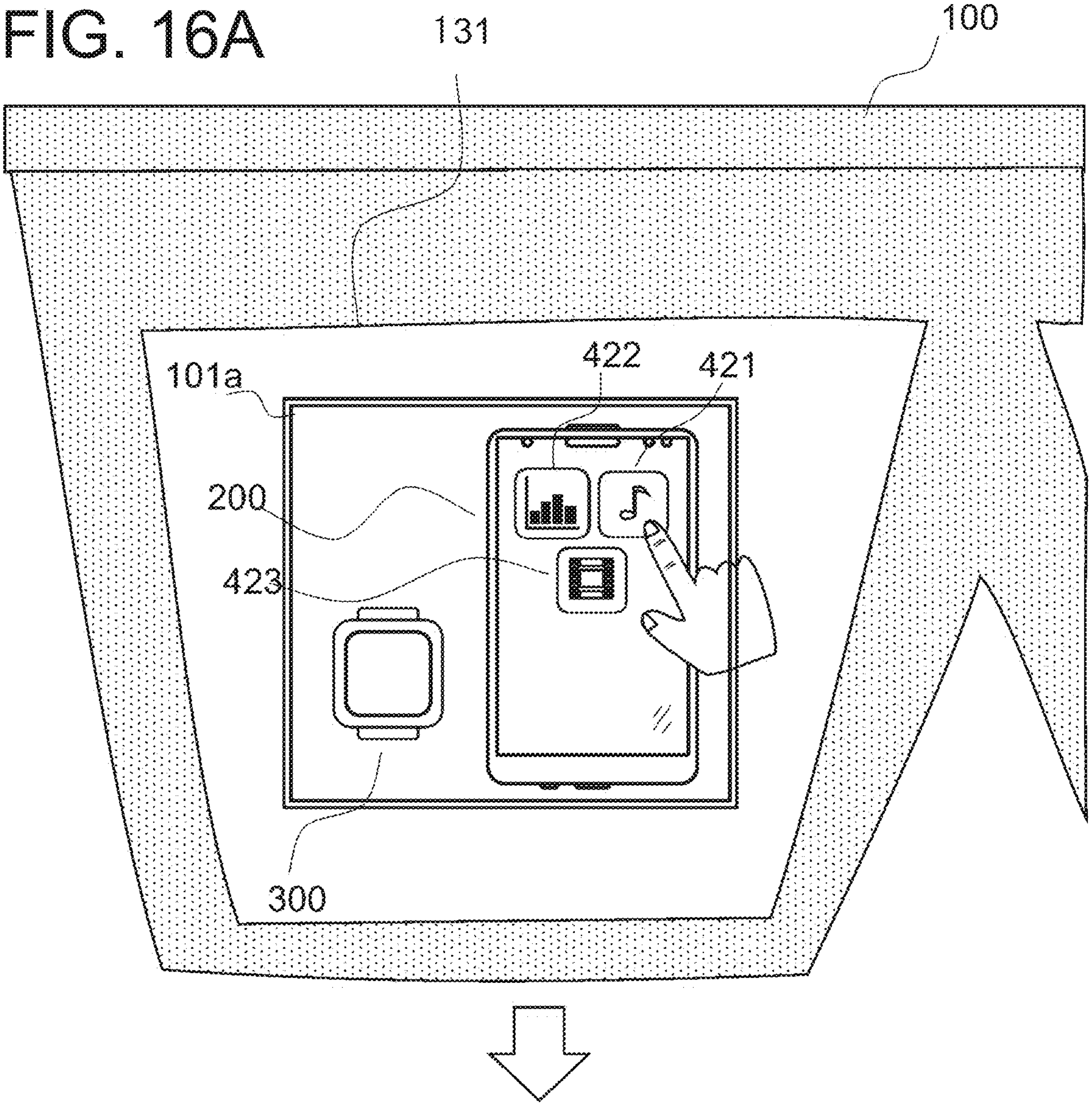
FIG. 16(*a*) and FIG. 16(*b*) are diagrams for explaining a linked state according to the seventh embodiment.
Figure 16B:
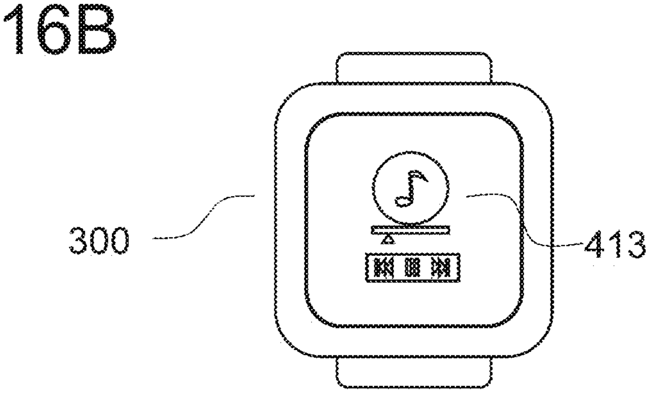

Specifically, as illustrated in FIG. 16(*a*), based on the placement state in which both the screen of the smartphone 200 displaying the icon 420 and the SW 300 are included within the linkage visual field 101*a* of the display 131, the HMD 100 determines that the smartphone 200 and the SW 300 are in the linked state. In the case where the program of the application corresponding to the icon 420 is installed in the SW 300, as illustrated in FIG. 16(*b*), the SW 300 executes the selected application.

FIG. 17 illustrates the hardware configuration of the SW 300 according to the present embodiment. As illustrated in FIG. 17, the SW 300 according to the present embodiment includes a main processor 311, a system bus 312, a memory and storage 310, an operation acceptance device 320, an image processing device 330, an audio processing device 340, a sensor 350, a communication device 360, an extended interface (I/F) section 305, a timer 306, and a vibrator 307.

The details of the devices are basically the same as those of the HMD 100 with the same name, respectively. However, the operation acceptance device 320 of the SW 300 further includes a touch panel 323. The touch panel 323 includes the touch panel 323 which is superimposed on the display 331.

[Function Blocks]

Figure 18:
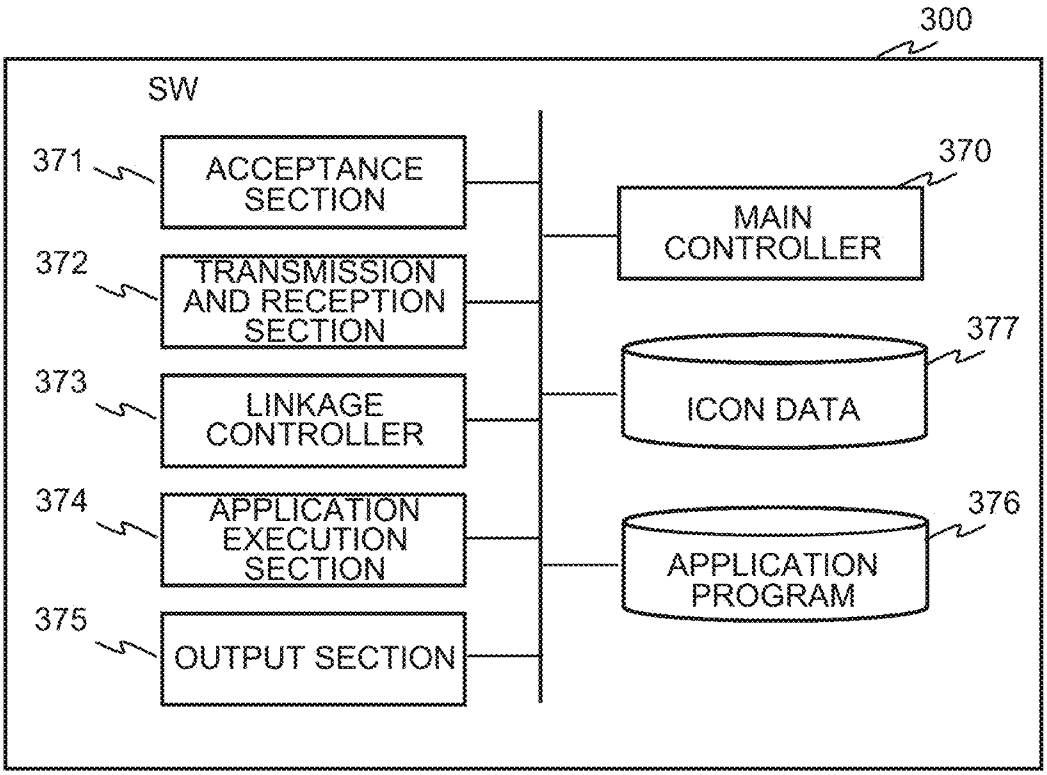
FIG. 18 is a functional block diagram of the smartwatch according to the seventh embodiment.

FIG. 18 illustrates functional blocks of the SW 300. As illustrated in FIG. 18, the SW 300 includes a main controller 370, an acceptance section 371, a transmission and reception section 372, a linkage controller 373, an application execution section 374, an output section 375, an icon data storage 377, and an application program storage 376.

The functional blocks have the same functions as those of the HMD 100 with the same name, respectively. Note that, in the same manner as the linkage controller 273 of the smartphone 200, the linkage controller 373 of the SW 300 determines whether the SW 300 operates in the linkage operation mode for causing the SW 300 to execute an application with being linked with other terminals. When determining that the operation mode is the linkage operation mode, the linkage controller 373 causes the application execution section 374 to start an application in response to an instruction to start the application from other information terminals.

[Processing Flow]

Figure 19:
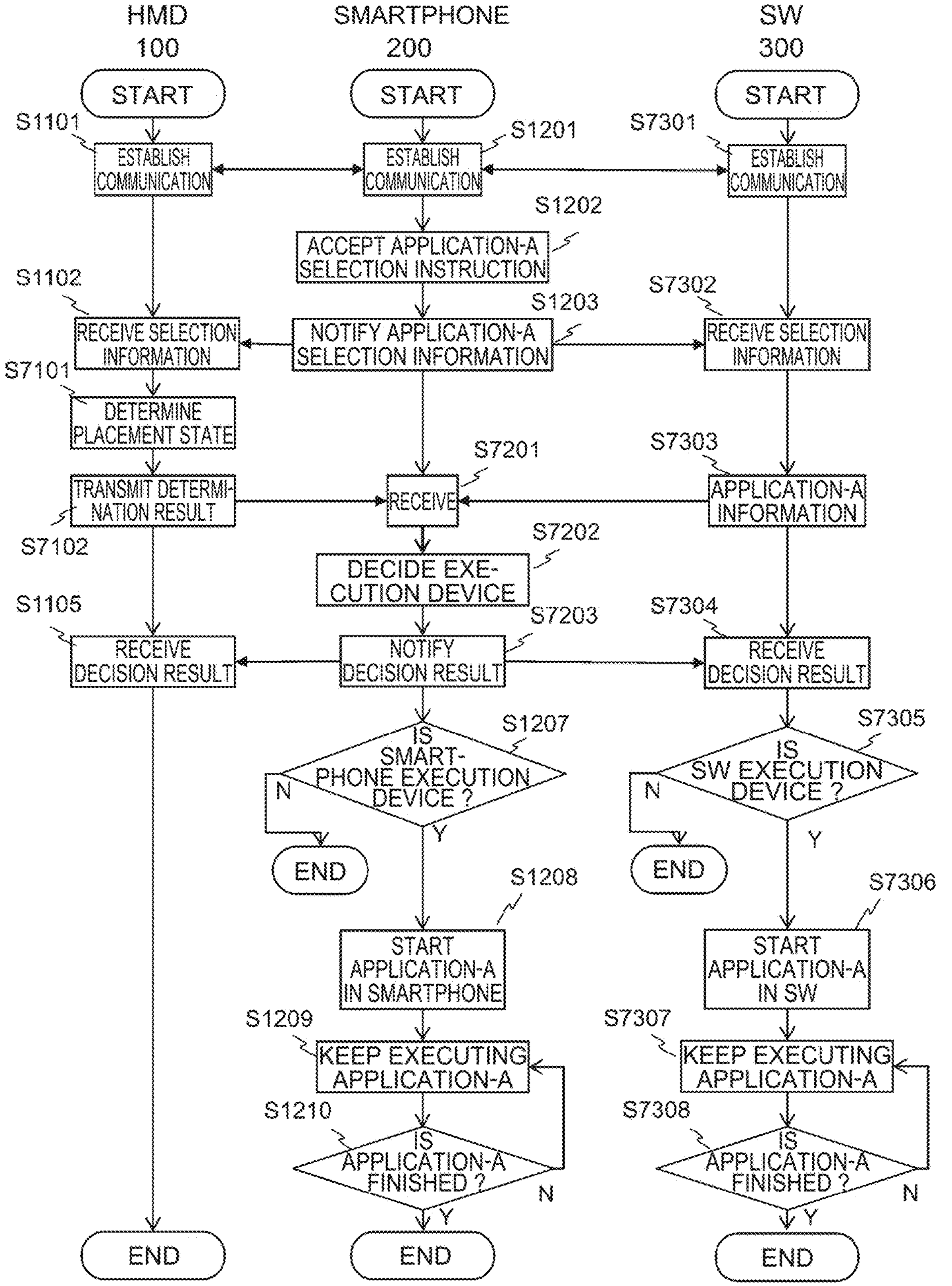
FIG. 19 illustrates an exemplary flowchart of the application linkage processing according to the seventh embodiment.

Hereinafter, a flow of the application linkage processing in the information processing system 500 according to the present embodiment will be described. FIG. 19 illustrates a processing flow of the application linkage processing according to the present embodiment. The same processes as those in the application linkage processing of the first embodiment are provided with the same reference signs, and the repetitive explanation thereof will be omitted.

Firstly, the HMD 100 and the smartphone 200, and the SW 300 and the smartphone 200 establish communication with each other (step S1101, step S1201, step S1301). In the same manner as in the first embodiment, the transmission and reception sections 172, 272, 372 perform data communication so as to establish communication.

The smartphone 200 accepts a selection instruction of the application A (step 31202).

The smartphone 200 notifies the HMD 100 and the SW 300 of the selection information of the application A (step S1203).

The linkage determination section 173 of the HMD 100 determines whether the smartphone 200 and the SW 300 are in the placement state in which they can be linked with each other in accordance with the approach described above (step 37101), and transmits the result of determination to the smartphone 200 (step 37102). Note that if communication is also established between the HMD 100 and the SW 300, the HMD 100 may transmit the result of determination to the SW 300 as well.

Upon receiving the selection information of the application A from the smartphone 200, the linkage controller 373 of the SW 300 determines whether the application A has been installed in the own device, and transmits a result of determination to the smartphone 200 as the application A information (step 37303).

Upon receiving the determination result regarding the placement state from the HMD 100 and the application A information from the SW 300 (step S7201), the linkage controller 273 of the smartphone 200 uses the received information to determine whether the own device and the SW 300 are in the linked state, and decides the execution device to be used for executing the application A (step S7202). In the present embodiment, based on the information indicating that the placement state in which linkage can be established is satisfied and the application A has been installed in the SW 300, the linkage controller 273 decides the SW 300 as the execution device. In other cases, the linkage controller 273 decides the smartphone 200 as the execution device.

The linkage controller 273 of the smartphone 200 notifies the HMD 100 and the SW 300 of a result of decision (step S7203). Upon receiving the result of decision, the HMD 100 ends the processing.

Thereafter, the smartphone 200 executes the processes after step S1207.

In the case where the SW 300 is decided as the execution device (step S7305), the SW 300 starts the application A installed in the SW 300 (step S7306), keeps executing the application A until the application A is finished (step S7307, step S7308), and then ends the processing.

On the other hand, in the case where the SW 300 is not decided as the execution device, the SW 300 ends the processing.

As described above, the information processing system 500 according to the present embodiment includes the HMD 100, the smartphone 200, and the SW 300 as a plurality of terminals. The HMD 100 determines whether the linked state, in which the smartphone 200 is operable in the linkage operation mode, is established. Upon being determined to be in the linked state, the smartphone 200 operates in the linkage operation mode and transmits an instruction to start the selected application to the SW 300. Upon receiving the instruction to start the selected application, the SW 300 starts and executes the application.

As described above, according to the present embodiment, an application can be started in the SW 300 by the smartphone 200 having good operability. The HMD 100 determines the positional relation between the smartphone 200 and the SW 300 through the visual field of the HMD 100 serving as the third information terminal, thereby realizing the linkage between the smartphone 200 and the SW 300. This improves the operability at the time of executing an application in the SW 300. That is, in the present embodiment, a highly convenient linkage technology of the information terminal can be realized without the burden on the user 501.

Furthermore, according to the present embodiment, a user who is about to start an application can start the desired application on the SW 300 by touching an icon displayed on the smartphone 200 having good operability in the placement state in which the icon displayed on the smartphone 200 and the SW 300 can be viewed through the visual field of the HMD 100. This allows a display section and an operation section of the SW 300 to be simple. That is, the configuration of the SW 300 can be simplified.

In the present embodiment, in the same manner as in the first embodiment, the HMD 100 may be decided as the execution device in the case where the predetermined placement state in which the smartphone 200 is included within the linkage visual field 101*a* of the HMD 100 is satisfied but the placement state in which the SW 300 is included within the linkage visual field 101*a* is not satisfied. In this case, the smartphone 200 transmits an instruction to start the application to the HMD 100 so as to start the application A in the HMD 100.

Furthermore, in the present embodiment, the first information terminal is not limited to the SW 300 but for example, may be a tablet, a PC, or another smartphone 200 different from the second information terminal as long as it is an information terminal capable of starting an application and easily and suitably being positioned for use.

Still further, in the present embodiment, in the same manner as in the fourth embodiment, the smartphone 200 may be configured to synchronize with the SW 300 and execute an application so as to accept an operation on the application. In the same manner as in the fifth embodiment, the SW 300 may be configured to receive transferred data from the smartphone 200 before executing the application. In the same manner as in the sixth embodiment, the smartphone 200 may execute the application while the SW 300 receives only the execution result and outputs the received execution result.

Transferring data of a file stored in the smartphone 200 to cause the SW 300 to play the data using an application for playing files mounted on the SW 300 can eliminate the need for the SW 300 to hold all file data at all times, thereby realizing reduction in the data capacity which is important for a small and multifunctional wristwatch-type information terminal such as the SW 300.

First Modification

In each of the embodiments described above, whether the two information terminals are in the predetermined placement state is determined based on whether the two information terminals are in the predetermined positional relationship. That is, it is determined based on whether the placement in which, for example, the icon 420 on the display 231 of the smartphone 200 is included with the linkage visual field 101*a* of the HMD 100 is established. However, the determination approach is not limited thereto.

For example, using an ultra-wideband (UWB) wireless system to detect the positional relationship among the information terminals and the orientations thereof enables identification and determination as to whether the smartphone 200 and the HMD 100 are in the predetermined placement. Furthermore, determining the motion of each of the information terminals based on the output information from the various types of sensors 150, 250 mounted on the smartphone 200 and HMD 100, respectively, enables detection of the positional relationship among the terminals and orientations thereof, which thus may be used in the identification and determination as to whether the terminals are in the predetermine placement state.

Furthermore, whether the information terminals are in the predetermined placement state may be determined based on, for example, a distance between two information terminals. For example, it may be determined based on the distance between the HMD 100 and the smartphone 200. That is, when the distance between them is less than a predetermined distance threshold value, it is determined that the predetermined placement state is satisfied.

For example, in the first, second, and seventh embodiments, the distance between them is measured by the depth sensor 155 of the HMD 100, while, in the third embodiment, it is measured by the depth sensor 255 of the smartphone 200.

In particular, determining whether the predetermined placement state is satisfied based on the distance between the HMD 100 and the smartphone 200 can make the processing simple. That is, a user can start a desired application on the HMD 100 by touching an icon using the smartphone 200 in the vicinity of a certain range, without caring about whether the smartphone 200 is included within the linkage visual field 101*a* of the HMD 100. Furthermore, a user can start the application on the smartphone 200 by intentionally moving the smartphone 200 away from the HMD 100 by a predetermined distance or more. This further improves the convenience for a user, and as compared with employing the processing of determining using the linkage visual field 101*a*, can reduce erroneous operations, such as failing to move the smartphone 200 away from the linkage visual field 101*a* against the user's intention.

Still further, the linkage visual field 101*a* may not have to be set. In this case, the predetermined placement state is determined to be satisfied when the icon 420 of the smartphone 200 overlaps a predetermined region including an intersection point of the detected line-of-sight direction of the user 501 and the display 131.

Even in the situation where the icon 420 of the smartphone 200 on the display 131 is visible to the user 501 wearing the HMD 100, the application is not started on the HMD 100 unless the user 501 makes his or her line of sight match the icon 420. This can realize a device with higher operability.

Still further, the predetermined placement state may be determined to be satisfied in the case where the linkage visual field 101*a* has been set, the icon 420 is included within the range of the linkage visual field 101*a*, and also the user 501 is making his or her line of sight match the icon 420.

Second Modification

In the embodiments described above, an application is started on a predetermined information terminal based on the determination that the linked state is established. However, the approach of deciding an application execution device is not limited thereto.

In an exemplary approach, after it is determined that the linked state is established, a device to execute an application may be decided in accordance with the modes of selection operation on the icon 420 displayed on the smartphone 200. For example, a single tap of the icon 420 means execution on the smartphone 200, a double tap means execution on the HMD 100, and the like.

In a further exemplary approach, whether the linked state is established is determined by another method while which device is used as an execution device may be decided using the line-of-sight direction of the user 501. In this case, when the detected line-of-sight of the user 501 is not on the icon 420 nor the display 231 of the smartphone 200, the HMD 100 does not start the application even if the linked state is established.

Thus, a user can start an application intentionally on the smartphone 200 instead of on the HMD 100 by operating the icon while placing the smartphone 200 within the field of view but turning the line of sight away from the smartphone 200.

Furthermore, an execution device may be decided not only using the line-of-sight direction but also by an action in which the user 501 opens and closes his or her eyes. In this case, images captured by the in-camera 134 for a predetermined period of time are analyzed, and whether the user 501 has closed the eyes for a predetermined designated period, in which intentional closing of the eyes different from blinking can be determined, is identified. For example, a user can decide to start the application on the smartphone 200 by touching the icon 420 while closing the eyes for the predetermined designated period of time.

Still further, a user may be allowed to start the application on the smartphone 200 by intentionally closing the eyes when lifting his or her finger after tapping the icon with the finger. This is useful when the user constantly wearing the HMD 100 intends to start the application on the smartphone 200 explicitly.

Still further, a user may be allowed to start the application on the smartphone 200 by closing one of the eyes. This allows the user to view the icon 420 with the other one of the eyes and thus easily perform desired operational actions.

Third Modification

Figure 20A:
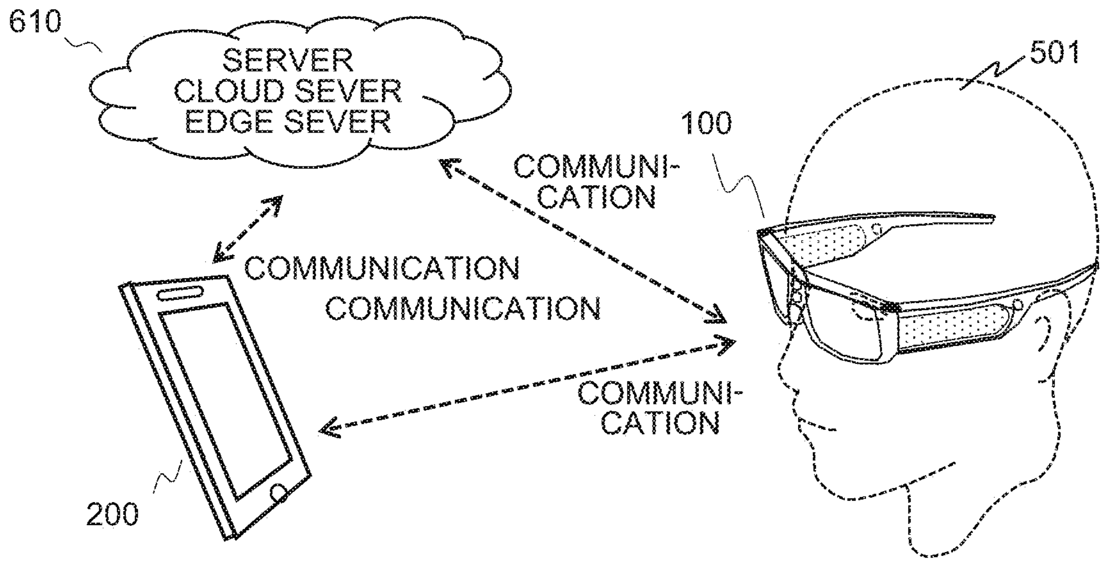
FIG. 20(*a*) and FIG. 20(*b*) are diagrams for explaining an outline of an information processing system according to a modification of the present invention.
Figure 20B:
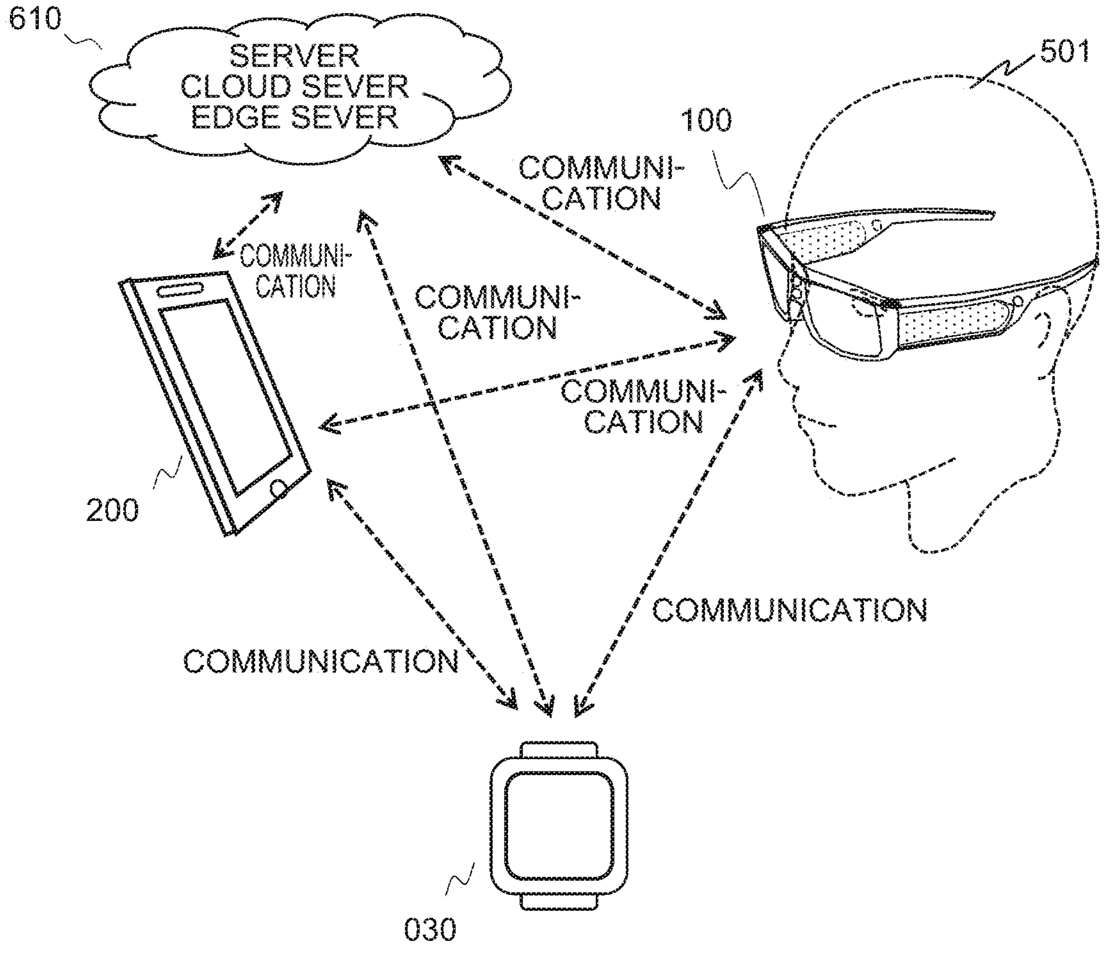
Figure 21A:
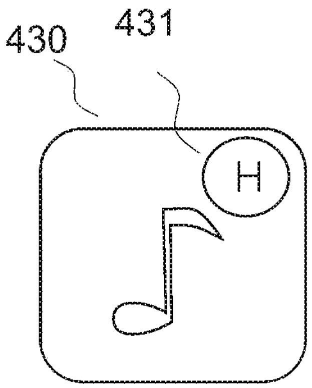
FIG. 21(*a*) to FIG. 21(*e*) are diagrams for explaining icon display modes according to the modification of the present invention.
Figure 21B:
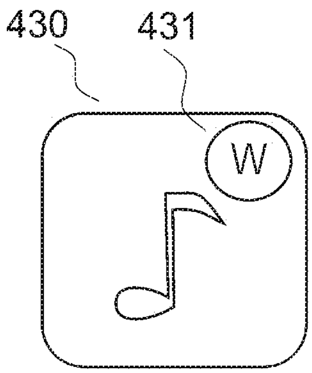
Figure 21C:
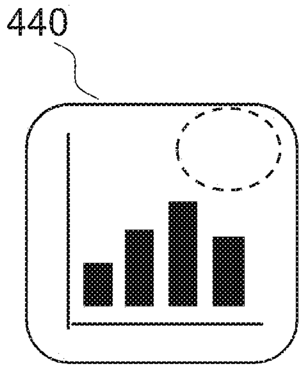
Figure 21D:
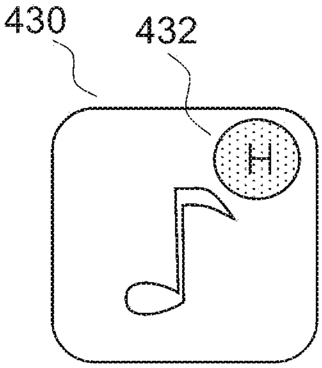
Figure 21E:
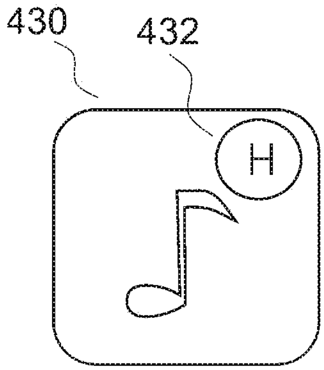

Transmission and reception of data between the information terminals according to each of the embodiments described above is not limited to direct wireless communication therebetween. For example, as illustrated in FIG. 20(*a*) and FIG. 20(*b*), data may be transmitted and received via a server 610.

Similarly, in the case where applications, files, and data are stored in the server 610, they may be appropriately transferred to each of the information terminals by communication in accordance with an instruction from the smartphone 200 and used therein. In the case where an application is started on the server 610 in accordance with an instruction from the smartphone 200, the playing information thereof may be transferred to the information terminal decided by each of the embodiments, and then viewed thereon.

Note that the form of the server 610 is not limited, and may be, for example, a local server, a cloud server, an edge server, a net service, or the like as long as it can be connected to each of the information terminals via communication to transmit and receive necessary information.

Furthermore, instead of transferring the large-capacity content data from the smartphone 200 to the HMD 100, the content data may be downloaded from a cloud network to the HMD 100. For example, image applications for high-resolution videos requires a very large amount of data, and thus this is particularly efficient in view of reduction in the capacity in the HMD 100. In this case, using a high-speed and high-capacity communication network such as 5G or (5th generation mobile communication system) local 5G for data communication enables further improvement in usability.

Fourth Modification

In the present modification, a terminal mark (hereinafter, referred to as a "small icon"), which is a small figure indicating which information terminal is capable of starting an application or a file, is added to a predetermined position on the display region of the icon 420 to be touched by the user 501. FIG. 21(*a*) to FIG. 21(*c*) illustrate examples of the icons including the small icons. Here, and example of the icon 430 of the application A which is an application for playing music is illustrated.

FIG. 21(*a*) illustrates an example in which the icon 430 includes a small icon 431 indicating that this application can be started by the HMD 100. FIG. 21(*b*) illustrates an example in which the icon 430 includes a small icon 432 indicating that the application A can be started the SW 300.

FIG. 21(*c*) illustrates an example of an application that can be started only by the smartphone 200. Here, an icon 440 of a spreadsheet application is illustrated as an example. In FIG. 21(*c*), a small icon is not being displayed at a predetermined position in the icon 440 of the spreadsheet application.

This enables a user who is about to touch an icon on the smartphone 200 to visually recognize whether a small icon as illustrated in FIG. 21(*a*), FIG. 21(*b*), and FIG. 21(*c*) is present in the icon to be touched, and also grasp in advance which information terminal can be caused to start the application by a touching operation on the icon, thereby easily improving the usability.

Note that the small icons illustrated in FIG. 21(*a*), FIG. 21(*b*), and FIG. 21(*c*) indicate information terminals that can be started when the predetermined placement state becomes satisfied, regardless of whether the information terminals are being in the predetermined placement state.

Furthermore, upon receiving information indicating that each information terminal includes the application A from the HMD 100 or the SW 300, the linkage controller 273 of the present embodiment displays the small icon 431 at a predetermined position of the icon 430. Alternatively, before displaying the small icon 431, the HMD 100, the SW 300, and the smartphone 200 may exchange the information whether application programs thereof have been installed.

FIG. 21(*d*) and FIG. 21(*e*) illustrate other examples of the small icon 431. The small icon 431 may be display when the icon 420 is touched in such a manner that and information terminal capable of starting an application or a file can be identified among the information terminals being linked with each other. That is, the mode for displaying the small icon 431 may be changed depending on whether the linked state is established.

For example, in the case where the smartphone 200 and the HMD 100 are in the linked state with each other and an application or a file is started on the HMD 100 by touching the icon 420, as illustrated in FIG. 21(*d*), a highlighted (shaded) small icon 432 is displayed. On the other hand, in the case where the smartphone 200 is not in the linked state and thus starts the application on the own terminal, as illustrated in FIG. 21(*e*), a small icon 433 without being highlighted (shaded) is displayed.

As described above, displaying the small icon 431 enables the user 501 to easily grasp the information terminal that can start an application. This allows the user 501 to intentionally select the information terminal for starting an application.

Note that, as an approach for identification notification other than displaying the small icon 431, audio information informing which information terminal can start the application may be notified to the user 501 via the speaker 141 (headphone).

Furthermore, in the HMD 100, vibration information identifying which information terminal can start the application by means of the magnitude, type, or the like of the vibration may be notified to the user 501 via the vibrator 107. This can further improve convenience for the user 501.

Whether to display the small icon may be designated, for each application, at the time of installation of the application as an initial setting. The user 501 can change the initial setting. Whether to display the small icon may be switched (by controlling OS or the like), for all the applications, by an instruction provided from the user 501.

Fifth Modification

In each of the embodiments and modifications described above, as a method of detecting a touching operation on an icon, the method of detecting a touching operation on an icon by means of the operation acceptance device 120 of the smartphone 200 has been described. However, the present invention is not limited thereto. For example, using the out-camera 133 of the HMD 100 to capture an image of the touching operation on the icon on the smartphone 200 and analyzing the captured image enables detection of the touching operation of the icon. Furthermore, as a method of identifying a position of an icon, transmitting the coordinates thereof on the display 231 of the smartphone 200 captured by the out-camera 133 of the HMD 100 from the HMD 100 to the smartphone 200 may enable the smartphone 200 to identify the position of an application and thus notify the HMD 100 of the information.

Sixth Modification

In the embodiments described above, the HMD 100 and the smartphone 200 are exemplified as the information terminals, however, the information terminals may be sufficient if they can acquire the placement information on a plurality of information terminals. For example, both of the information terminals may be smartphones. In this case, capturing an image of a smartphone 200A, which displays the icon 420 to accept a touching operation, by a smartphone 200B different from the smartphone 200A and touching the icon causes the application to be started on the smartphone 200B.

Furthermore, the same applications may be operated among the information terminals. For example, in the case where the same map applications are used on the smartphone 200 and the HMD 100 which are in the predetermined placement, causing these terminals to operate in linkage such that, the smartphone 200 displays a detailed map while the HMD 100 displays a simplified map, can improve usability.

Seventh Modification

In addition, the same or corresponding applications may be synchronized and installed, such as installing an application in one of the information terminals and then installing the relevant application in the other one of the information terminals as well. In the case where, although a certain application is selected on one of the information terminals, the other one of the information terminals does not have the same application nor the corresponding application, the other one of the information terminals may download and install the selected application from a server or other information terminals, and then use it.

Furthermore, the information terminals may be associated (pairing, group setting, and the like) with each other in advance. In a certain information terminal, in the case where communication was established with another information terminal that has not been associated therewith, the certain information terminal may inquire the user 501 whether to associate the certain information terminal with another information terminal, and upon receiving the intention of the user 501 to associate with this information terminal, make the association at that point in time.

The present invention is not limited to the embodiments described above, but includes other various modifications. For example, the embodiments described above have been explained in detail in order to clarify the present invention, but are not necessarily limited to those having all the features as described. In addition, a part of the configuration of the present embodiments and modifications can be replaced with that of other embodiments and modifications, and the features of other embodiments and modifications can be added to the configuration of the present embodiments and modifications. Furthermore, it is possible to add, delete, or replace other configurations with respect to a part of the configuration of the present embodiments and modifications.

Some or all the configurations, functions, processing units, and processing means described above may be implemented by hardware, for example, by designing them with an integrated circuitry. In addition, the configurations and functions described above may be implemented by software by interpreting and executing programs in which the processor implements the respective functions. Information such as programs, tables, and files for implementing various functions can be placed in recording devices such as a memory, hard disk, and solid-state drive (SSD), or recording media such as an IC card, SD card, and DVD.

Furthermore, the control lines and information lines which are considered to be necessary for the purpose of explanation are indicated herein, but not all the control lines and information lines of actual products are necessarily indicated. It may be considered that almost all the configurations are actually connected to each other.

REFERENCE SIGNS LIST

100: HMD, 101*a*: linkage visual field, 103: RAM, 104: ROM, 105: extended interface section, 106: timer, 107: vibrator, 110: memory and storage, 111: main processor, 112: system bus, 113: RAM, 114: ROM, 120: operation acceptance device, 121: operation key, 122: touch sensor, 123: touch panel, 130: image processing device, 131: display, 131*a*: left-eye display, 131*b*: right-eye display, 133: out-camera, 134: in-camera, 140: audio processing device, 141: speaker, 143: microphone, 150: sensor, 151: receiver, 152: gyro sensor, 153: geomagnetic sensor, 154: acceleration sensor, 155: depth sensor, 160: communication device, 161: LAN communication I/F, 162: telephone network communication I/F, 163: BT communication I/F, 170: main controller, 171: acceptance section, 172: transmission and reception section, 173: linkage determination section, 174: application execution section, 175: output section, 176: application program storage, 177: icon data storage,

200: smartphone, 200A: smartphone, 200B: smartphone, 201: main processor, 201*a*: image capturing range, 202: system bus, 205: extended interface section, 206: timer, 207: vibrator, 210: memory and storage, 211: main processor, 213: RAM, 214: ROM, 220: operation acceptance device, 223: touch panel, 230: image processing device, 231: display, 234: in-camera, 240: audio processing device, 241: speaker, 250: sensor, 255: depth sensor, 260: communication device, 263: BT communication I/F, 270: main controller, 271: acceptance section, 272: transmission and reception section, 273: linkage controller, 274: application execution section, 275: output section, 276: application program storage, 277: icon data storage,

300: smartwatch, 305: extended interface section, 306: timer, 307: vibrator, 310: memory and storage, 311: main processor, 312: system bus, 320: operation acceptance device, 323: touch panel, 330: image processing device, 331: display, 340: audio processing device, 350: sensor, 360: communication device, 370: main processor, 371: acceptance section, 372: transmission and reception section, 373: linkage controller, 374: application execution section, 375: output section, 376: application program storage, 377: icon data storage,

411: icon, 420: icon, 421: icon, 430: icon, 431: small icon, 432: small icon, 433: small icon, 440: icon, 500: information processing system, 501: user, 610: server

The invention claimed is:

1. An information processing system for linking a plurality of terminals to execute an application commonly provided in each of the plurality of terminals, the information processing system comprising:

a first information terminal and a second information terminal as the plurality of terminals, the second information terminal including:

second circuitry configured to display, on a second display provided in the second information terminal, an icon for accepting an instruction to start the application, and accept the instruction to start the application; and automatically cause the second information terminal to operate in either an independent operation mode or a linkage operation mode, and the first information terminal including:

first circuitry configured to determine whether the linked state is established, and output an execution result of the application executed in the linkage operation mode, wherein the independent operation mode is an operation mode for causing the second information terminal to execute the application independently, the linkage operation mode is an operation mode for causing the first information terminal and the second information terminal to execute the application with the first information terminal and the second information terminal being linked with each other, a linked state in which the second information terminal is operable in the linkage operation mode being defined based on placement of the first information terminal and the second information terminal, the linked state is established when the first circuitry identifies the icon displayed on the second display from within a predetermined linkage visual field of a first display of the first information terminal, and in response to the linked state being established, second circuitry is configured to operate the second information terminal in the linkage operation mode in which the first information terminal and the second information terminal execute the application together.

2. The information processing system according to claim 1, wherein the first circuitry is further configured to determine whether the linked state is established, and in response to determining that the linked state is established, the first circuitry is configured to instruct the second information terminal to operate in the linkage operation mode.

3. The information processing system according to claim 1, wherein the second circuitry is configured to determine whether the second information terminal is in the linked state, and in response to determining that the second information terminal is in the linked state, cause the second information terminal to operate in the linkage operation mode.

4. The information processing system according to claim 1, further comprising:

a third information terminal as one of the plurality of terminals, wherein the third information terminal includes third circuitry configured to determine whether a placement state in which the second information terminal is operable in the linkage operation mode is satisfied, and in response to determining that the placement state in which the second information terminal is operable in the linkage operation mode is satisfied, cause the second information terminal to operate in the linkage operation mode.

5. The information processing system according to claim 1, wherein when the second information terminal operates in the linkage operation mode, the second circuitry is configured to transmit a start instruction to start the application to the first information terminal, and the first circuitry is configured to execute the application upon receiving the start instruction to start the application from the second information terminal.

6. The information processing system according to claim 5, wherein the second circuitry is further configured to:

execute the application upon transmitting the start instruction to start the application; and display an execution status of the application on the second display, and synchronize with the first circuitry to execute the application.

7. The information processing system according to claim 1, wherein when the second information terminal operates in the linkage operation mode, the second circuitry is configured to transmit data necessary for execution of the application to the first information terminal, and the first circuitry is configured to, upon receiving the data necessary for execution of the application from the second information terminal, execute the application using the data.

8. The information processing system according to claim 1, wherein when the second information terminal operates in the linkage operation mode, the second circuitry is configured to execute the application and transmit a result of the execution to the first information terminal.

9. The information processing system according to claim 1, wherein whether the linked state is established is determined based on a distance between the second information terminal and the first information terminal.

10. The information processing system according to claim 1, wherein the second circuitry is configured to display, on the second display, the icon for accepting the instruction to start the application and to accept the start instruction to start the application via the icon, wherein the icon includes a terminal mark that is information identifying a type of the terminal capable of starting the application associated with the icon.

11. The information processing system according to claim 10, wherein a display mode of the terminal mark is changed when the application is being executed on the terminal identified by the terminal mark.

12. The information processing system according to claim 1, wherein, in response to the first circuitry of the first information terminal determining that the linked state is established, the second circuitry is configured to cause the second information terminal to execute the application while synchronizing with the execution of the application on the first information terminal, the second circuitry is configured to display an operation screen for accepting an operation on the application being executed in the linked state on the second display, and the second circuitry is configured to transmit an operation signal corresponding to the accepted operation to the first information terminal to control the execution of the application on the first information terminal.

13. The information processing system according to claim 1, wherein in the linkage operation mode, the second circuitry is configured to cause the second information terminal to operate as a remote control for the application executed in the first information terminal by accepting a user operation on the second information terminal and transmitting a control signal to the first information terminal to change an execution state of the application on the first information terminal.

14. The information processing system according to claim 1, wherein the first information terminal further includes an imaging sensor configured to capture an image of a real space including the second display, and the first circuitry is configured to determine whether the linked state is established by performing pattern matching between the captured image and stored icon data to identify the icon within the predetermined linkage visual field.

15. The information processing system according to claim 1, wherein the first circuitry is configured to determine that the linked state is established based on a distance between the first information terminal and the second information terminal being less than a predetermined distance threshold.

16. The information processing system according to claim 1, wherein the first circuitry is configured to determine that the linked state is established based on a detected line-of-sight of a user of the first information terminal matching a display coordinate of the icon displayed on the second display.

17. The information processing system according to claim 1, wherein the second circuitry is configured to change a display mode of the icon to a highlighted state in response to receiving a signal from the first information terminal indicating that the linked state is established.

18. A non-transitory computer-readable medium having stored thereon computer-executable instructions which, when executed by a processor of an information processing system comprising a first information terminal and a second information terminal, cause the information processing system to execute operations comprising:

displaying, by the second information terminal on a second display, an icon for accepting a start instruction to start an application commonly provided in the first and second information terminals;

determining, by first circuitry of the first information terminal, whether a linked state is established, wherein the linked state is established when the first circuitry identifies the icon displayed on the second display from within a predetermined linkage visual field of a first display of the first information terminal;

accepting, by the second information terminal, the start instruction via the icon; and causing, by second circuitry of the second information terminal, the second information terminal to operate in one of an independent operation mode and a linkage operation mode based on the determination of whether the linked state is established, wherein the independent operation mode causes the second information terminal to execute the application independently, and the linkage operation mode causes the first information terminal and the second information terminal to execute the application such that the first information terminal and the second information terminal execute the application together and the first information terminal outputs an execution result of the application.

19. The non-transitory computer-readable medium according to claim 18, wherein the operations further comprise, in response to determining that the linked state is established, causing the second information terminal to execute the application while synchronizing with the execution of the application on the first information terminal, displaying an operation screen for accepting an operation on the application being executed in the linked state on the second display, and transmitting an operation signal corresponding to the accepted operation to the first information terminal to control the execution of the application on the first information terminal.

20. The non-transitory computer-readable medium according to claim 18, wherein the operations further comprise, in the linkage operation mode, causing the second information terminal to operate as a remote control for the application executed in the first information terminal by accepting a user operation on the second information terminal and transmitting a control signal to the first information terminal to change an execution state of the application on the first information terminal.

* * * * *